US011366515B2

(12) United States Patent
Liu et al.

(10) Patent No.: US 11,366,515 B2
(45) Date of Patent: *Jun. 21, 2022

(54) APPARATUS AND METHOD FOR CONTROLLING AN AUGMENTED REALITY DEVICE

(71) Applicant: QUALCOMM Incorporated, San Diego, CA (US)

(72) Inventors: Kexi Liu, San Diego, CA (US); Frederick D. Kim, Los Angeles, CA (US); Martin H. Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,103

(22) Filed: May 23, 2019

(65) Prior Publication Data

US 2019/0278367 A1 Sep. 12, 2019

Related U.S. Application Data

(63) Continuation of application No. 13/740,256, filed on Jan. 13, 2013, now Pat. No. 10,359,841.

(51) Int. Cl.
*G06F 3/01* (2006.01)
*G06F 3/04815* (2022.01)
(Continued)

(52) U.S. Cl.
CPC ........... *G06F 3/013* (2013.01); *G02B 27/017* (2013.01); *G06F 3/04815* (2013.01);
(Continued)

(58) Field of Classification Search
CPC ... G06T 19/006; G06F 3/013; G06F 3/04815; G02B 27/017; G02B 2027/0178
See application file for complete search history.

(56) References Cited

U.S. PATENT DOCUMENTS 8,482,527 B1  7/2013  Kim
8,736,692 B1  5/2014  Wong et al.
(Continued)

FOREIGN PATENT DOCUMENTS

CN  102035935 A  4/2011
JP  H07200632 A  8/1995
(Continued)

OTHER PUBLICATIONS

Bonino D. et al., "A Blueprint For Integrated Eye-Controlled Environments", Universal Access In The Information Society ; International Journal, Springer, Berlin, DE, vol. 8, No. 4, Mar. 11, 2009 (Mar. 11, 2009), pp. 311-321, XP019744028, ISSN: 1615-5297, DOI: 10.1007/S10209-009-0145-4.
(Continued)

*Primary Examiner* — Ryan R Yang
(74) *Attorney, Agent, or Firm* — Qualcomm Incorporated

(57) ABSTRACT

An apparatus, a method, and a computer program product are provided. The apparatus detects an eye gaze on a first region in a real world scene, sets a boundary that surrounds the first region, the boundary excluding at least a second region in the real world scene, performs an object recognition procedure on the first region within the boundary, and refrains from performing an object recognition procedure on the at least the second region.

40 Claims, 18 Drawing Sheets

(51) Int. Cl.
*G06T 19/00* (2011.01)
*G02B 27/01* (2006.01)

(52) U.S. Cl.
CPC ...... *G06T 19/006* (2013.01); *G02B 2027/014* (2013.01); *G02B 2027/0127* (2013.01); *G02B 2027/0178* (2013.01); *G02B 2027/0187* (2013.01)

(56) References Cited

U.S. PATENT DOCUMENTS

| | | | |
|---|---|---|---|
| 9,279,983 B1* | 3/2016 | Davis | G06F 3/0488 |
| 10,359,841 B2* | 7/2019 | Liu | G02B 27/017 |
| 2004/0008137 A1 | 1/2004 | Hassebrock et al. | |
| 2008/0226199 A1* | 9/2008 | Breglio | G06F 3/0484 |
| | | | 382/311 |
| 2008/0229232 A1* | 9/2008 | Schulz | G06F 3/0481 |
| | | | 715/781 |
| 2009/0327927 A1 | 12/2009 | De et al. | |
| 2010/0053342 A1 | 3/2010 | Hwang et al. | |
| 2010/0134642 A1 | 6/2010 | Thorn | |
| 2011/0006978 A1 | 1/2011 | Yuan | |
| 2011/0182512 A1 | 7/2011 | Nishi | |
| 2011/0254698 A1 | 10/2011 | Eberl et al. | |
| 2011/0273466 A1 | 11/2011 | Imai et al. | |
| 2012/0019557 A1 | 1/2012 | Aronsson et al. | |
| 2012/0105486 A1 | 5/2012 | Lankford et al. | |
| 2012/0212499 A1 | 8/2012 | Haddick et al. | |
| 2012/0236031 A1 | 9/2012 | Haddick et al. | |
| 2012/0242698 A1 | 9/2012 | Haddick et al. | |
| 2012/0242838 A1 | 9/2012 | Kodama | |
| 2012/0290401 A1 | 11/2012 | Neven | |
| 2012/0308209 A1* | 12/2012 | Zaletel | G11B 31/006 |
| | | | 386/278 |
| 2012/0320224 A1 | 12/2012 | Miyoshi et al. | |
| 2013/0050070 A1 | 2/2013 | Lewis et al. | |
| 2013/0127980 A1 | 5/2013 | Haddick et al. | |
| 2013/0239057 A1 | 9/2013 | Ubillos et al. | |
| 2013/0241805 A1* | 9/2013 | Gomez | G06F 3/013 |
| | | | 345/8 |
| 2013/0321462 A1 | 12/2013 | Salter et al. | |
| 2014/0101608 A1 | 4/2014 | Ryskamp et al. | |

FOREIGN PATENT DOCUMENTS

| | | |
|---|---|---|
| JP | H11242733 A | 9/1999 |
| JP | 2003533768 A | 11/2003 |
| JP | 2006048171 A | 2/2006 |
| JP | 2007184683 A | 7/2007 |
| JP | 2007310572 A | 11/2007 |
| JP | 2008172368 A | 7/2008 |
| JP | 2010056692 A | 3/2010 |
| JP | 2012221062 A | 11/2012 |

OTHER PUBLICATIONS

International Preliminary Report on Patentability—PCT/US2014/011134, The International Bureau of WIPO—Geneva, Switzerland, dated Apr. 29, 2015.
International Search Report and Written Opinion—PCT/US2014/011134—ISA/EPO—dated May 9, 2014.
Reitmayr G. et al., "Collaborative Augmented Reality for Outdoor Navigation and Information browsing", Internet Citation, 2003, XP002376365, pp. 32-41. Retrieved from the Internet: URL: http://www.ims.tuwien.ac.at/publication_detail.php?ims_id=TR-188-2-2003-28 [retrieved on Apr. 10, 2006].
Toyama, et al., "Gaze Guided Object Recognition Using a Head-Mounted Eye Tracker," ETRA '12 Proceedings of the Symposium on Eye Tracking Research and Applications, 2012, pp. 91-98.
Tracy Falke., "Augmented Reality and the Future of Visual Search", Jul. 28, 2011, USA, pp. 1-9.

* cited by examiner

APPARATUS AND METHOD FOR CONTROLLING AN AUGMENTED REALITY DEVICE

CLAIM OF PRIORITY UNDER 35 U.S.C. § 120

The present application for patent is a Continuation of patent application Ser. No. 13/740,256 entitled "APPARATUS AND METHOD FOR CONTROLLING AN AUGMENTED REALITY DEVICE" filed Jan. 13, 2013 pending, and assigned to the assignee hereof and hereby expressly incorporated by reference herein.

BACKGROUND

Field

The present disclosure relates generally to an apparatus and method for controlling an augmented reality device.

Background

User interfaces for augmented reality on mobile device displays are not adequately intuitive. Traditional methods of interacting with augmented reality on a mobile device require users to point the device closely on the target to augment contents and touch the display of the mobile device for further control. This requires constant content switching between looking at the display and looking at real objects in real world scenes. Therefore, traditional methods of interacting with augmented reality are not adequately intuitive. As such, improved methods of interacting with augmented reality are needed to enhance efficiency as well as user experience and control.

With advanced mobile displays, such as head mounted optical devices configured to display content, the field of view is greatly expanded. Therefore, efficient processing techniques and heterogeneous user inputs for pointing to and augmenting objects of interest are valuable features for an augmented reality system.

SUMMARY

In an aspect of the disclosure, an apparatus, a method, and a computer program product are provided. The apparatus detects an eye gaze on a first region in a real world scene, sets a boundary that surrounds the first region, the boundary excluding at least a second region in the real world scene, performs an object recognition procedure on the first region within the boundary, and refrains from performing an object recognition procedure on the at least the second region.

DETAILED DESCRIPTION

Figure 1:
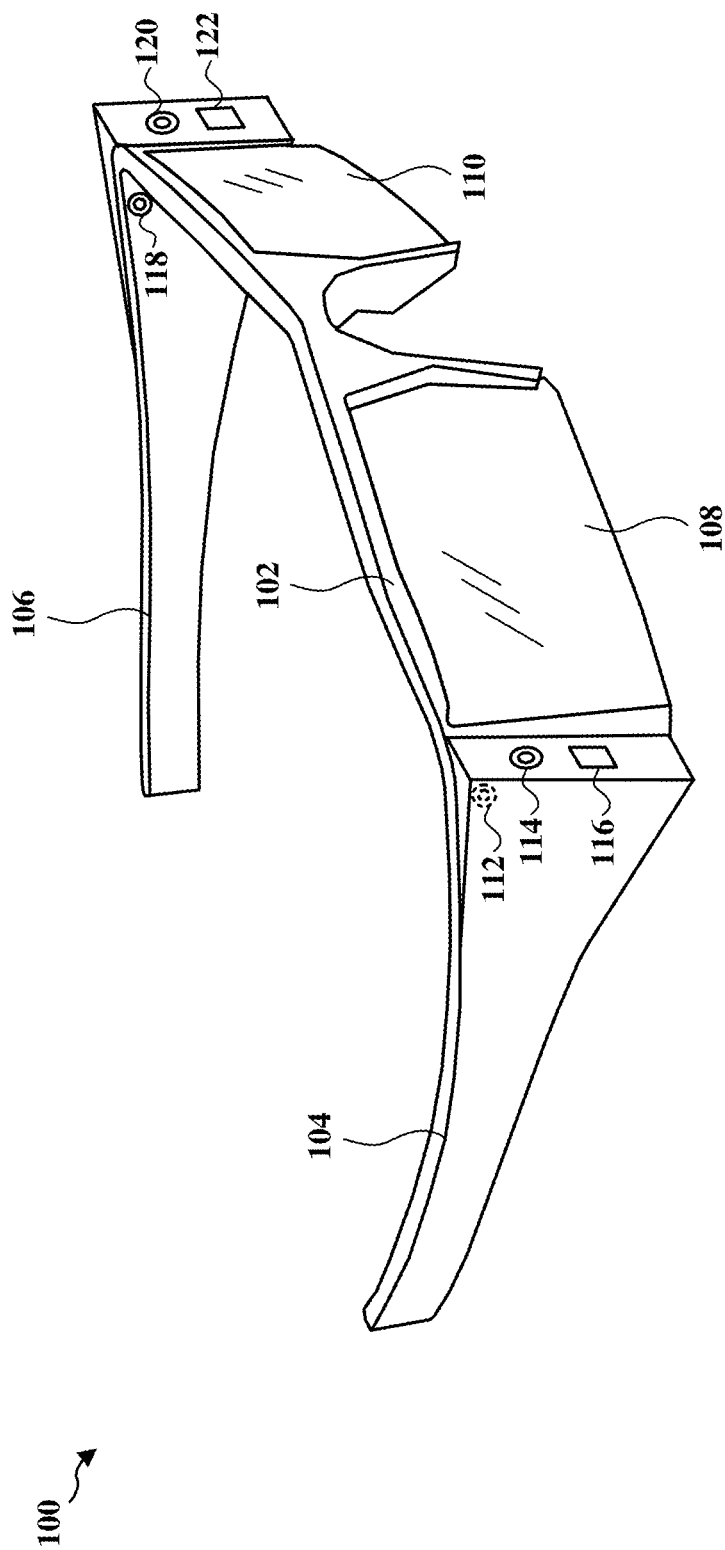
FIG. 1 is a diagram illustrating an optical device configured to display content.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects for controlling an augmented reality device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an optical device 100 configured to display content. As shown in FIG. 1, the optical device 100 includes a frame 102, temple portions 104 and 106, and lenses 108 and 110 mounted on the frame 102. The optical device 100 further includes rear facing cameras 112 and 118, front facing cameras 114 and 120, and sensors 116 and 122. In an aspect, each of the sensors 116 and 122 may include one or more proximity type sensors for detecting hand gestures and one or more microphones for detecting voice commands.

In an aspect, the optical device 100 may be configured as an augmented reality (AR) display (also referred to as "AR glasses" or a "head mounted display") that enables a user to interact with everyday environments in an intuitive manner. In one configuration, the lens 108 and/or lens 110 may be formed of a clear or see-through material, such as glass or plastic, to allow a user to clearly observe real world scenes when wearing the optical device 100. The optical device 100 may be configured to project content, such as digital AR imagery, through the lens 108 and/or lens 110 using methods known in the art. Accordingly, the user may concurrently observe a real world scene and the projected digital content while wearing the optical device 100.

Figure 2:
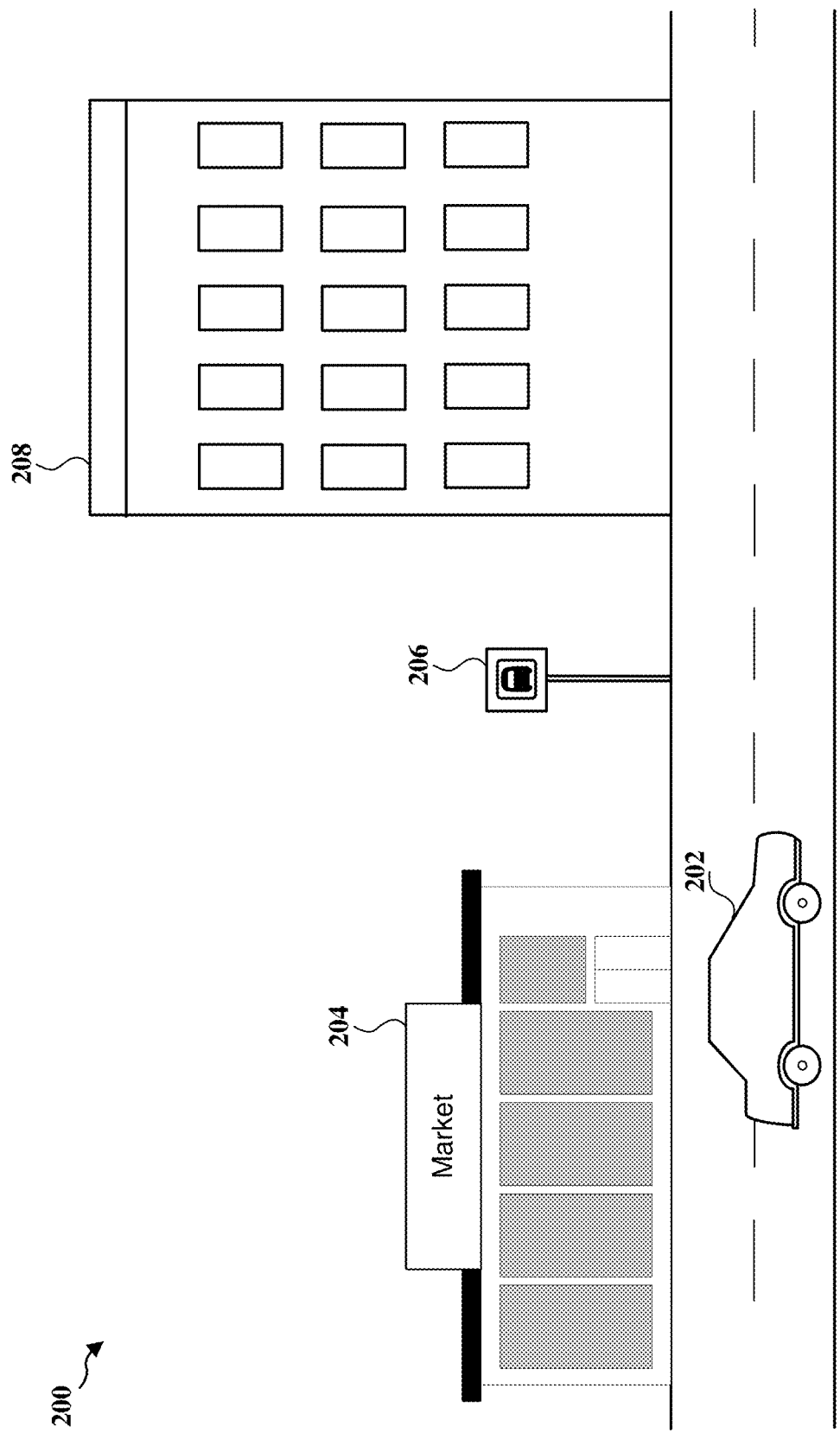
FIG. 2 illustrates a real world scene.

In an aspect, with reference to FIG. 1, the front facing camera 114 and/or front facing camera 120 may capture the user's field of view. The rear facing camera 112 and/or rear facing camera 118 may detect a user's eye gaze as the user observes a real world scene through the lenses 108 and 110. An example of a real world scene as observed by a user through the lenses 108 and 110 is illustrated in FIG. 2. As shown in FIG. 2, the real world scene 200 includes an automobile 202 in the foreground and includes a market 204, a bus sign 206, and a building 208 in the background.

Figure 3:
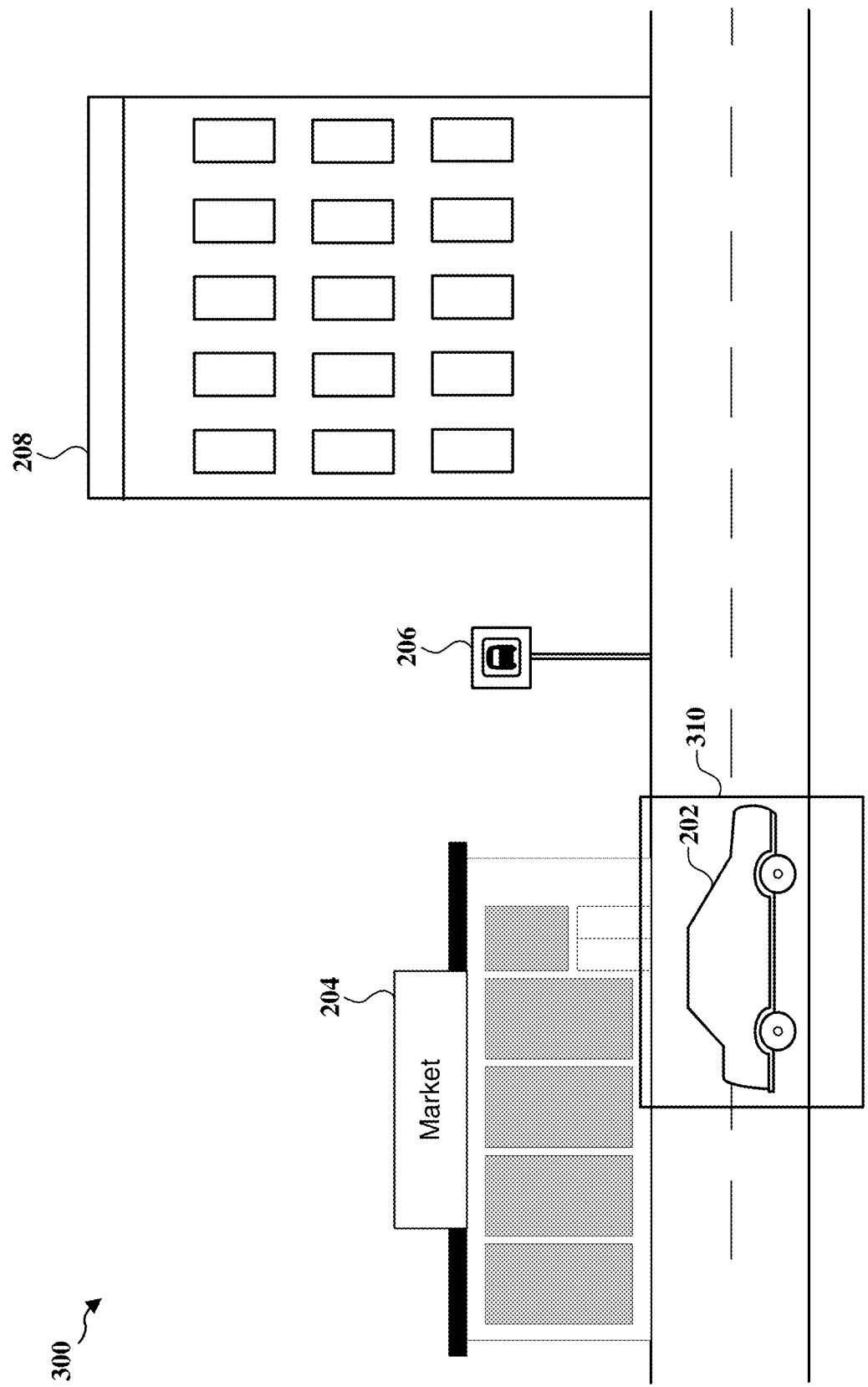
FIG. 3 illustrates a real world scene being observed by a user through the lenses of an optical device.

FIG. 3 illustrates a real world scene 300 being observed by a user through lenses 108 and 110 of the optical device 100. In FIG. 3, the user may gaze at the automobile 202 and the optical device 100 may detect the eye gaze of the user on a region in the real world scene 300 where the automobile 202 is located using the rear facing camera 112 and/or rear facing camera 118. The optical device 100 may then set a boundary 310 that surrounds the region. The optical device 100 may perform an object recognition procedure on the region within the boundary 310 and may refrain from performing the object recognition procedure on regions outside the boundary 310.

Figure 4:
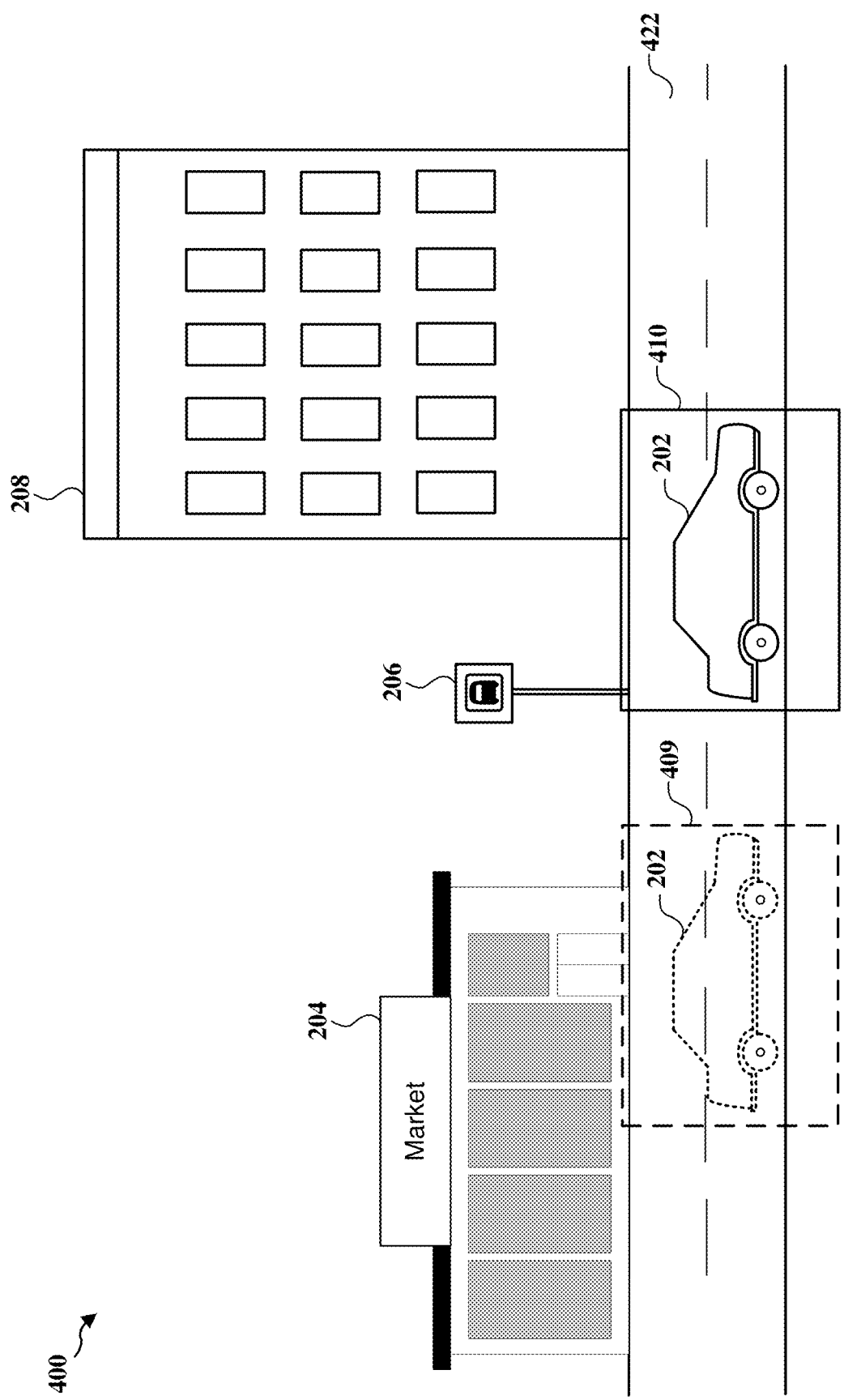
FIG. 4 illustrates a real world scene being observed by a user through the lenses of an optical device.

FIG. 4 illustrates a real world scene 400 being observed by a user through lenses 108 and 110 of the optical device 100. In FIG. 4, the user may gaze at the automobile 202 as the automobile 202 moves along the road 422 and the optical device 100 may detect the eye gaze of the user as the eye gaze follows the moving automobile 202. As shown in FIG. 4, the optical device 100 may initially set the boundary 409 on the region of the real world scene 400 corresponding to the detected eye gaze of the user. The optical device 100 may then track the eye gaze of the user to dynamically set the boundary 410 on the region of the real world scene 400 corresponding to the detected eye gaze of the user as the eye gaze follows the automobile 202. The optical device 100 may then perform an object recognition procedure on the region within the boundary 410 and may refrain from performing the object recognition procedure on regions outside the boundary 410.

Figure 5:
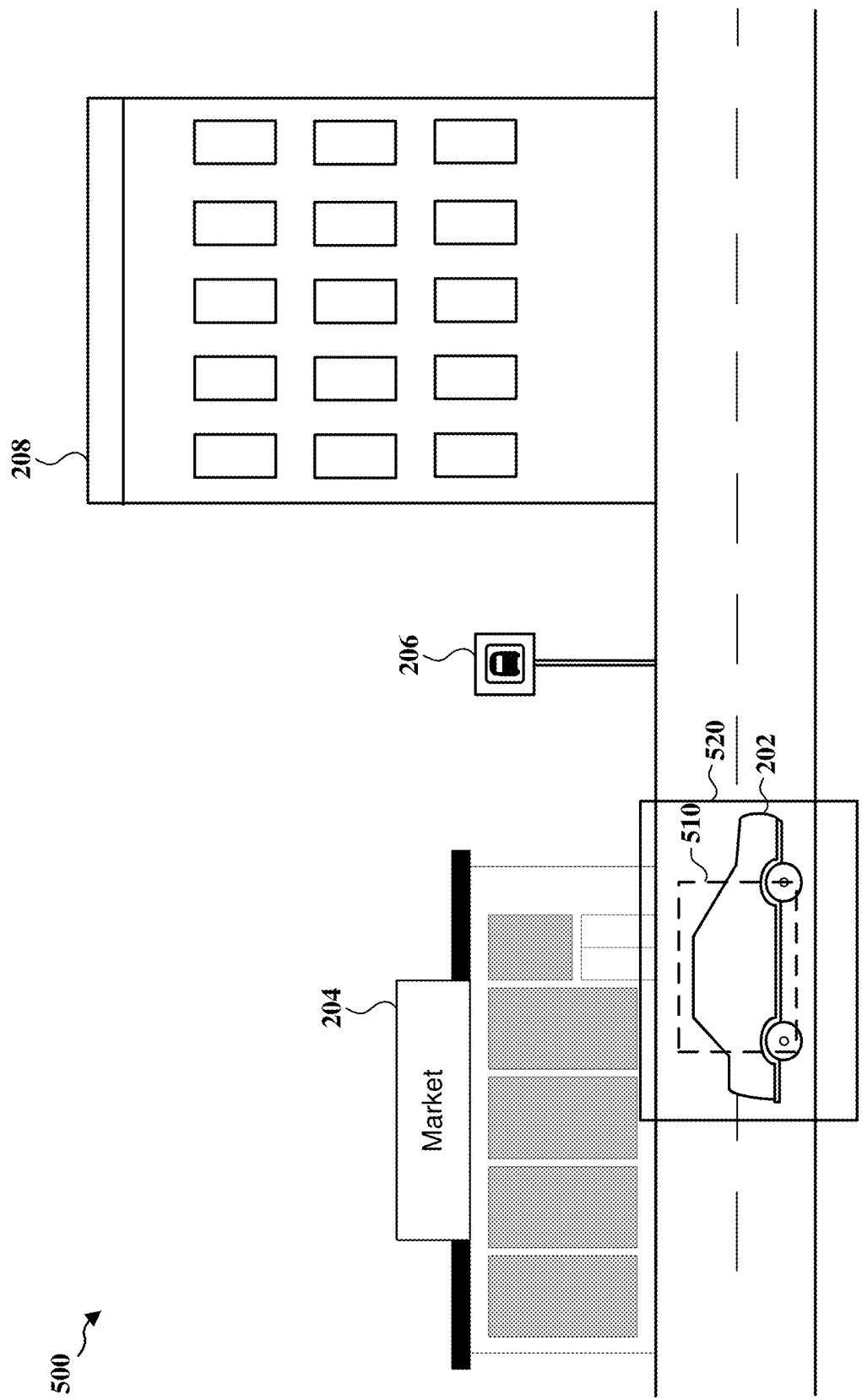
FIG. 5 illustrates a real world scene being observed by a user through the lenses of an optical device.

FIG. 5 illustrates a real world scene 500 being observed by a user through lenses 108 and 110 of the optical device 100. In FIG. 5, the user may gaze at the automobile 202 and the optical device 100 may detect the eye gaze of the user on a region in the real world scene 500 where the automobile 202 is located using the rear facing camera 112 and/or rear facing camera 118. The optical device 100 may then set a boundary 510 that surrounds the region. The optical device 100 may perform an object recognition procedure on the region within the boundary 510 and may refrain from performing the object recognition procedure on regions outside the boundary 510. In an aspect, the optical device 100 may dynamically adjust the size of the boundary 510 if the object recognition procedure fails to determine an object. For example, as shown in FIG. 5, if the object recognition procedure is not able to identify the automobile 202 within the boundary 510, the optical device 100 may increase the size of the boundary 510 to the size of boundary 520. In one configuration, the size of a boundary may be increased by a predetermined amount. For example, the mobile device may increase the size of a boundary by doubling the size of the original boundary.

Figure 6:
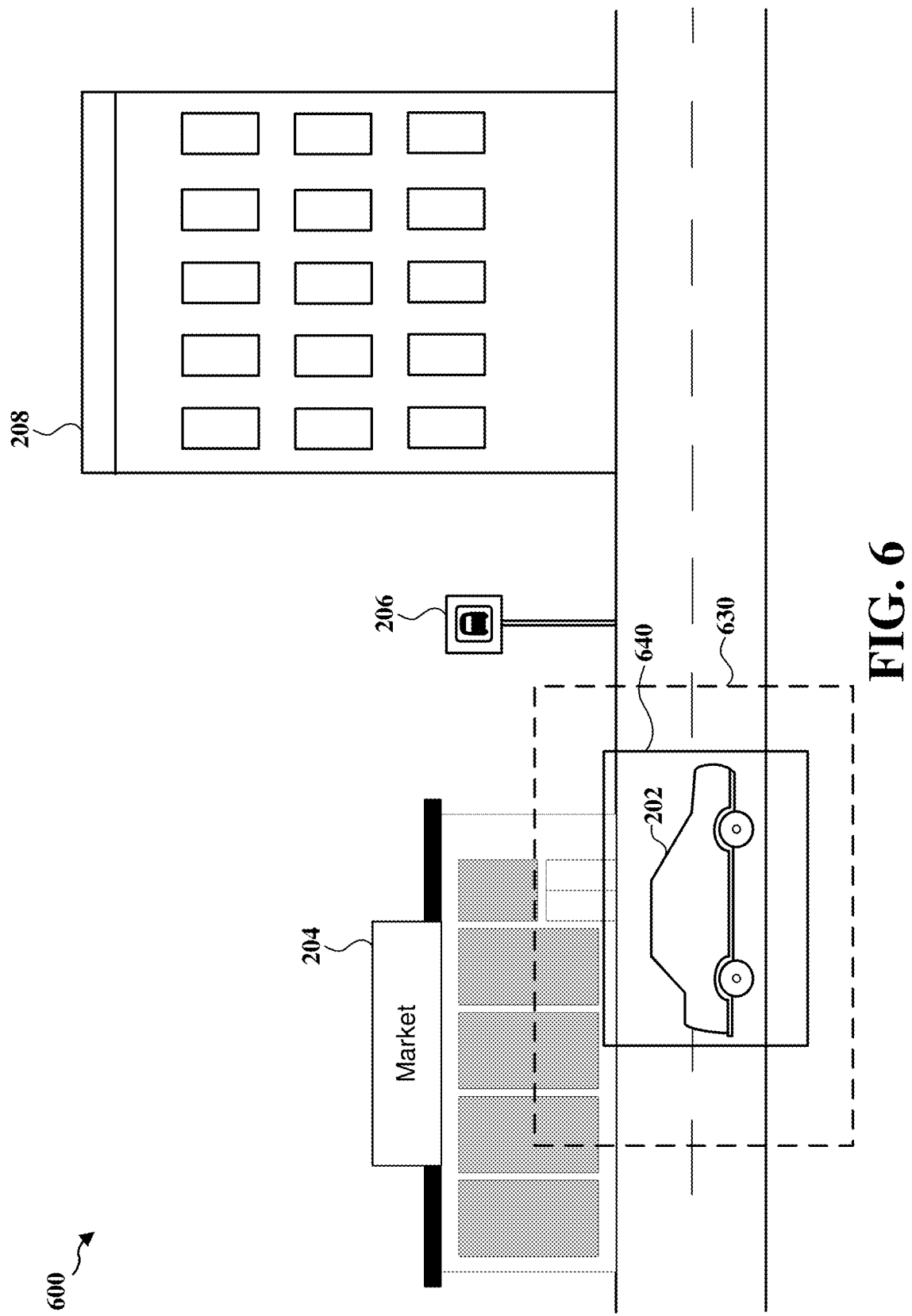
FIG. 6 illustrates a real world scene being observed by a user through the lenses of an optical device.

In another aspect, as shown in FIG. 6, the optical device 100 may decrease the size of the boundary. For example, if the battery power level of the optical device 100 is low and the optical device 100 is operating in a power saving state, the optical device 100 may reduce the boundary 630 to the size of the boundary 640 in the real world scene 600. In one configuration, the size of a boundary may be reduced by a predetermined amount. For example, the optical device 100 may reduce the size of a boundary to one half the size of the original boundary. The optical device 100 may then perform an object recognition procedure on the region within the boundary 640 and may refrain from performing the object recognition procedure on regions outside the boundary 640. Therefore, by reducing the size of the boundary and performing the object recognition procedure on the region within the reduced boundary, the optical device 100 may reduce the amount of processing needed to recognize an object and, therefore, may conserve battery power.

Figure 7:
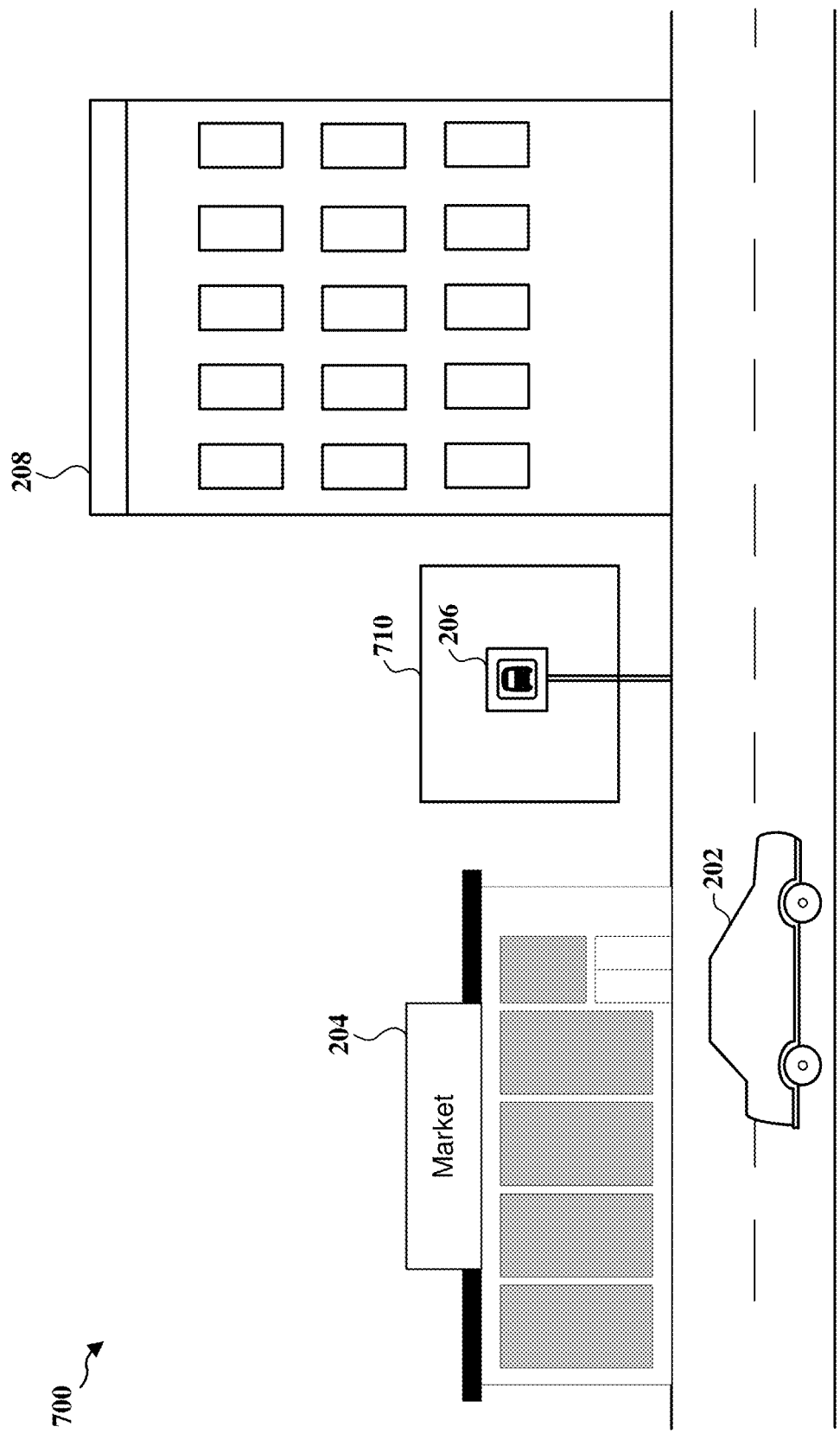
FIG. 7 illustrates a real world scene being observed by a user through the lenses of an optical device.
Figure 8:
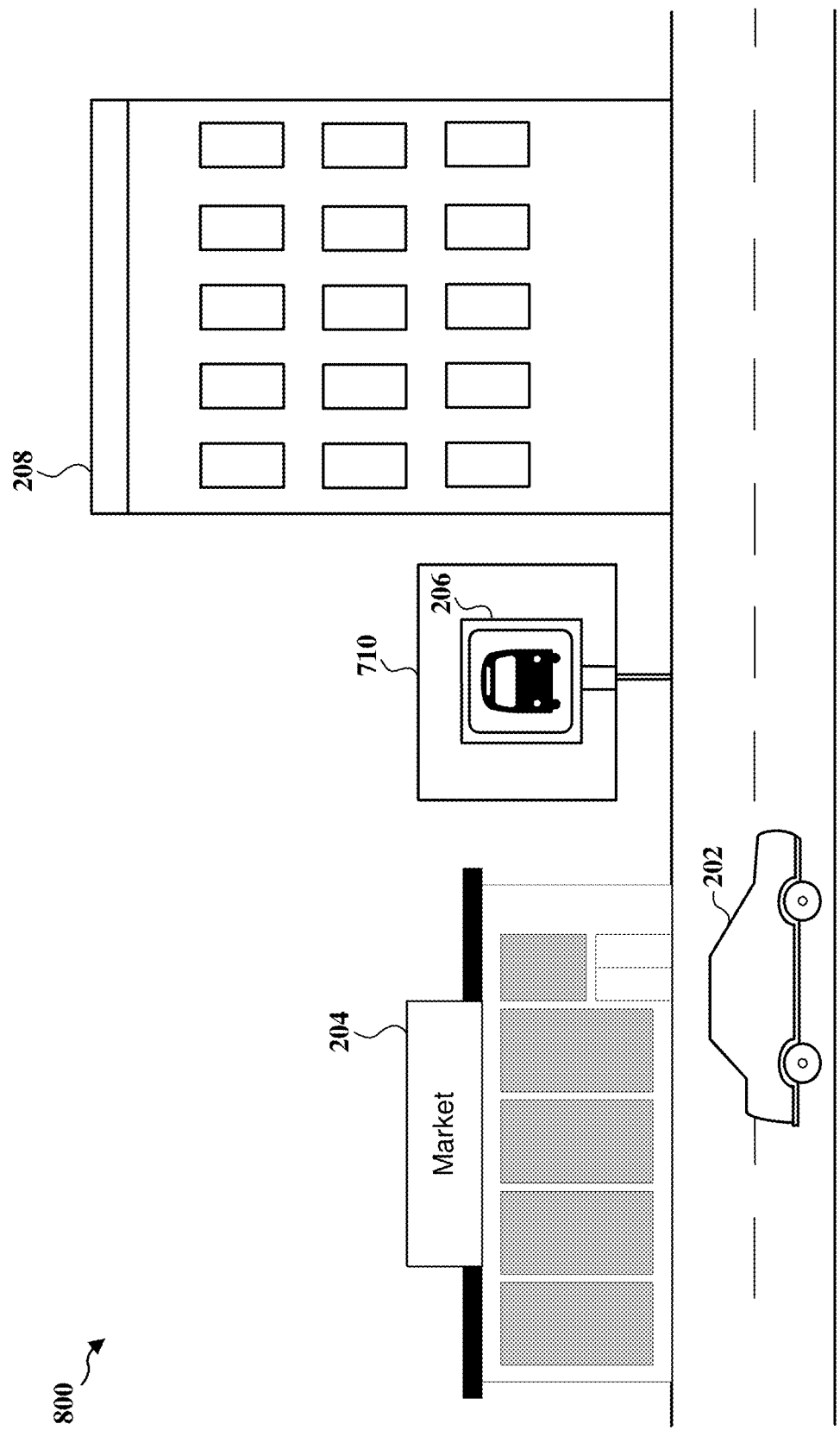
FIG. 8 illustrates a real world scene being observed by a user through the lenses of an optical device.

FIG. 7 illustrates a real world scene 700 being observed by a user through lenses 108 and 110 of the optical device 100. In FIG. 7, the user may gaze at the bus sign 206 and the optical device 100 may detect the eye gaze of the user on a region of the real world scene 700 where the bus sign 206 is located using the rear facing camera 112 and/or rear facing camera 118. The optical device 100 may set a boundary 710 that surrounds the region. The optical device 100 may then perform an object recognition procedure on the region within the boundary 710 and may refrain from performing the object recognition procedure on regions outside the boundary 710. In an aspect, the optical device 100 may adjust the magnification (also referred to as "zooming") of a portion of the real world scene 700 within the boundary 710 as shown in the real world scene 800 of FIG. 8. In an aspect, the optical device 100 may perform the magnification in response to a hand gesture and/or a voice command received via sensor 116 and/or sensor 122. In one configuration, the hand gesture may be "pinch zoom" gesture. In another aspect the, the optical device 100 may perform the magnification when the duration of the eye gaze of the user exceeds a time threshold. In another aspect, the optical device 100 may perform the magnification when the object within the boundary 710 is recognized before exceeding a time threshold in order to provide a better view of the object. In one configuration, application icons (not shown in FIG. 8) displayed proximate to the object by the optical device 100 may also be magnified.

Figure 9:
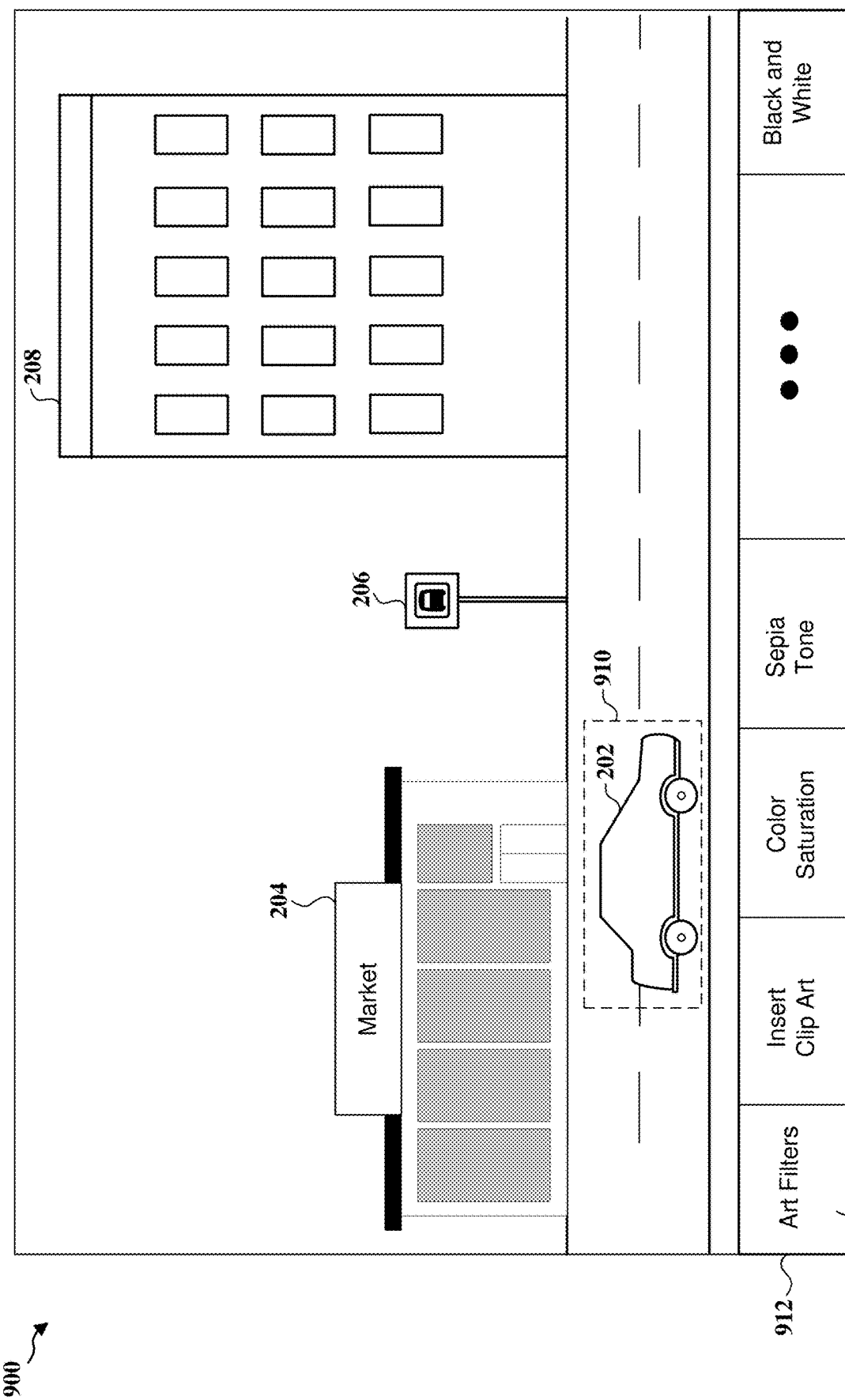
FIG. 9 illustrates a real world scene being observed by a user through the lenses of an optical device.

FIG. 9 illustrates a real world scene 900 being observed by a user through lenses 108 and 110 of the optical device 100. In FIG. 9, the user may gaze at the automobile 202 and the optical device 100 may detect the eye gaze of the user on a region of the real world scene 900 where the automobile 202 is located using the rear facing camera 112 and/or rear facing camera 118. The optical device 100 may then set a boundary 910 that surrounds the region. The optical device 100 may display a photo editing interface 912 that includes one or more photo editing tools, which may be used to edit the region within the boundary 910 prior to capturing a photo of the real world scene 900 with the front facing camera 114 and/or front facing camera 120. For example, the photo editing tools may include an art filter application tool 914 and/or other photo editing tools, such as a clip art insertion tool, a color saturation tool, a sepia tone conversion tool, and a black and white conversion tool. In an aspect, the photo editing tools may be applied or disabled in response to a voice command and/or a hand gesture received via sensor 116 and/or sensor 122. The optical device 100 may capture and store a photo of the real world scene 900 as edited using the previously discussed photo editing tools.

Figure 10:
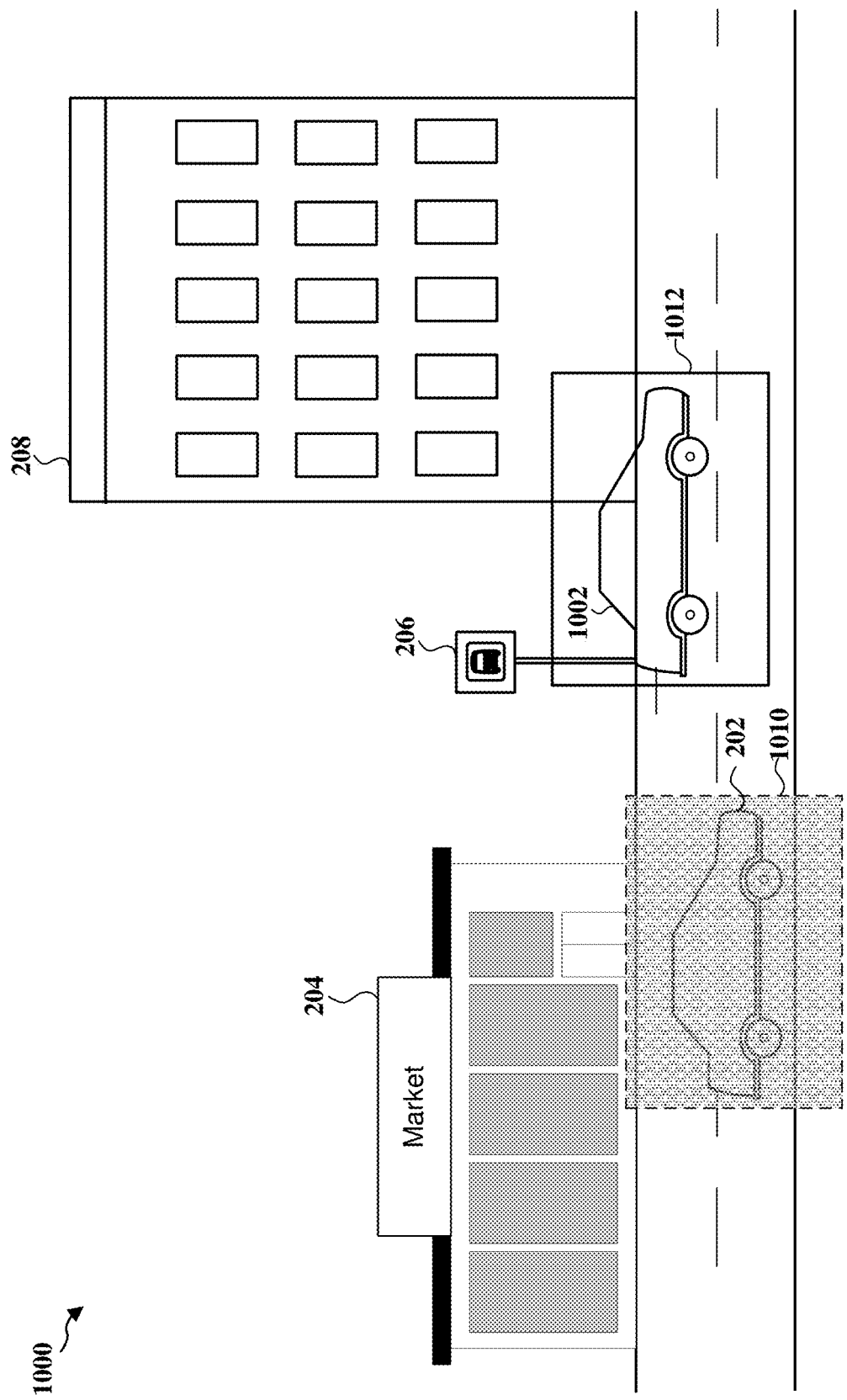
FIG. 10 illustrates a real world scene being observed by a user through the lenses of an optical device.

FIG. 10 illustrates a real world scene 1000 being observed by a user through lenses 108 and 110 of the optical device 100. In FIG. 10, the user may gaze at the automobile 202 and the optical device 100 may detect the eye gaze of the user on a region of the real world scene 1000 where the automobile 202 is located using the rear facing camera 112 and/or rear facing camera 118. The optical device 100 may then set a boundary 1010 that surrounds the region. The optical device 100 may then perform an object recognition procedure on the region within the boundary 1010 and may refrain from performing the object recognition procedure on regions outside the boundary 1010. The optical device 100 may then recognize the automobile 202 and may highlight the automobile 202 as shown in FIG. 10. In the configuration of FIG. 10, the optical device 100 may store the recognized automobile 202 in a memory of the optical device 100 in response to a voice command and/or a hand gesture received via sensor 116 and/or sensor 122. The user may subsequently gaze at the automobile 1002 and the optical device 100 may detect the eye gaze of the user on a region of the real world scene 1000 where the automobile 1002 is located using the rear facing camera 112 and/or rear facing camera 118. The optical device 100 may set a boundary 1012 that surrounds the region. The optical device 100 may then perform an object recognition procedure on the region within the boundary 1012 and may refrain from performing the object recognition procedure on regions outside the boundary 1012. The optical device 100 may then recognize the automobile 1002. The optical device 100 may store the recognized automobile 1002 in a memory of the optical device 100 in response to a voice command and/or a hand gesture received via sensor 116 and/or sensor 122. The optical device 100 may then compare the previously recognized and stored automobile 202 to the automobile 1002. The optical device 100 may indicate whether the automobile 202 is the same as or different from the automobile 1002.

Figure 11:
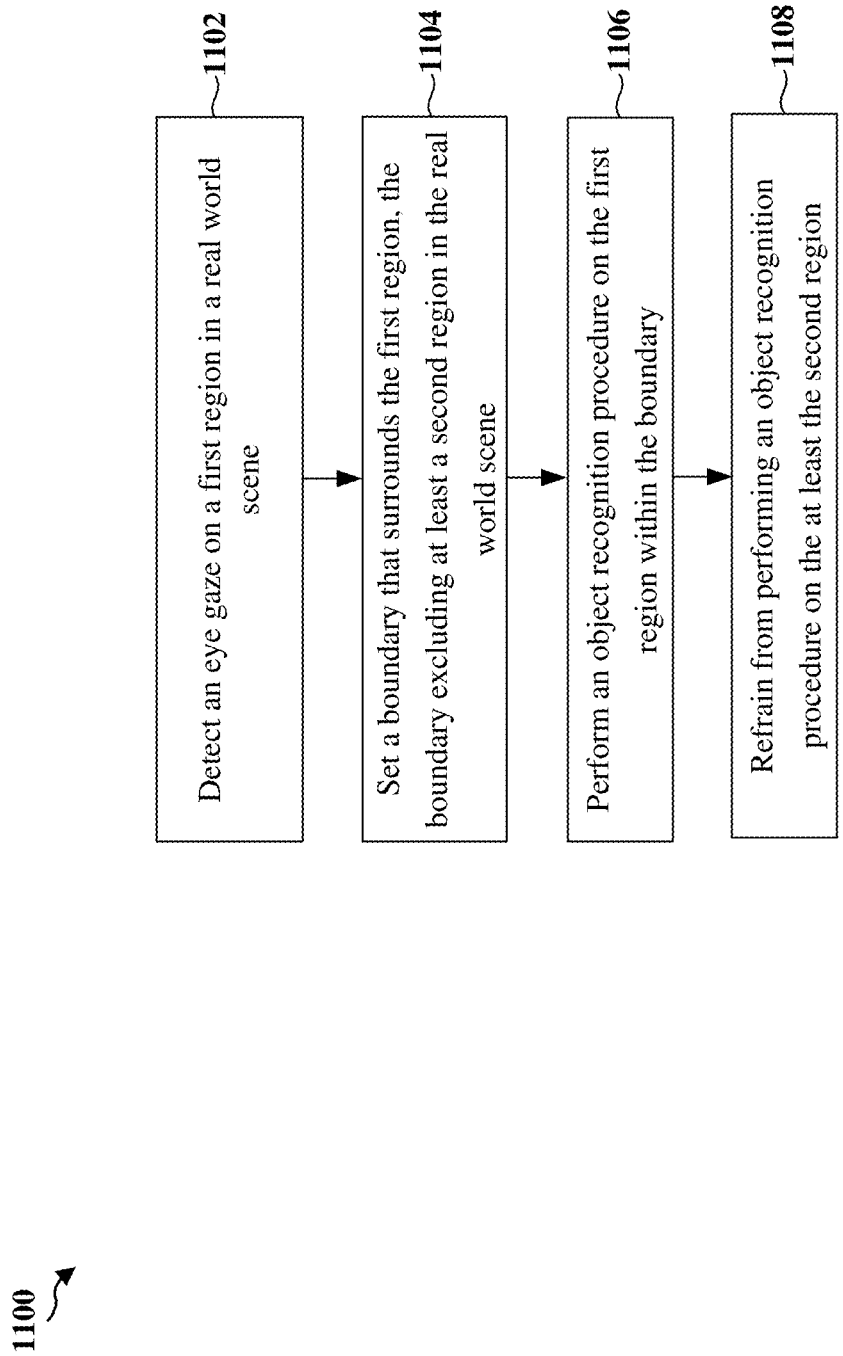
FIG. 11 is a flow chart of a method for an optical device configured to display content.

FIG. 11 is a flow chart 1100 of a method for an optical device configured to display content. At step 1102, the optical device 100 detects an eye gaze on a first region in a real world scene. In an aspect, with reference to FIG. 1, the rear facing camera 112 and/or rear facing camera 118 may detect a user's eye gaze as the user observes a real world scene through the lenses 108 and 110 of the optical device 100. The real world scene may include the physical environment within the field of view of a user of the optical device 100. An example of a real world scene as observed by a user through lenses 108 and 110 is illustrated in FIG. 2. As shown in FIG. 2, the real world scene 200 includes an automobile 202 in the foreground and includes a market 204, a bus sign 206, and a building 208 in the background. In other aspects, the real world scene may be an indoor real world scene, such as the inside of a home, an office, or a library. For example, the user may gaze at the automobile 202 and the optical device 100 may detect the eye gaze of the user on a region of the real world scene 200 where the automobile 202 is located using the rear facing camera 112 and/or rear facing camera 118.

At step 1104, the optical device 100 sets a boundary that surrounds the first region, the boundary excluding at least a second region in the real world scene. For example, with reference to FIG. 3, the optical device 100 may set a boundary 310 that surrounds the region of the real world scene 300 where the automobile 202 is located. In an aspect, the boundary may be displayed in the lens 108 and/or lens 110 of the optical device 100 such that the boundary overlays a portion of the real world scene 300 as the user observes the real world scene using the optical device 100. Although the boundary set by the optical device 100 is described herein as having a rectangular shape, it should be understood that the boundary may have any of a number of different shapes, such as a circular shape.

At step 1106, the optical device 100 performs an object recognition procedure on the first region within the boundary. For example, with reference to FIG. 3, the optical device 100 may perform an object recognition procedure on the region within the boundary 310. In one configuration, the optical device 100 may perform the object recognition procedure by capturing an image of the real world scene 300 using the front facing camera 114 and/or front facing camera 120 and by applying an object recognition algorithm on a region of the image corresponding to the region within the boundary 310. The optical device 100 may compare data generated by the object recognition algorithm to an object database to determine whether the data matches any of the objects in the object database in order to recognize an object. In an aspect, the database may be stored in the optical device 100. For example, with reference to FIG. 3, the optical device 100 may determine that the data generated by the object recognition algorithm matches an object identified as an automobile in the object database.

At step 1108, the optical device 100 refrains from performing an object recognition procedure on the at least the second region. For example, with reference to FIG. 3, the optical device 100 may refrain from performing the object recognition procedure on regions of the real world scene 300 outside the boundary 310.

Figure 12:
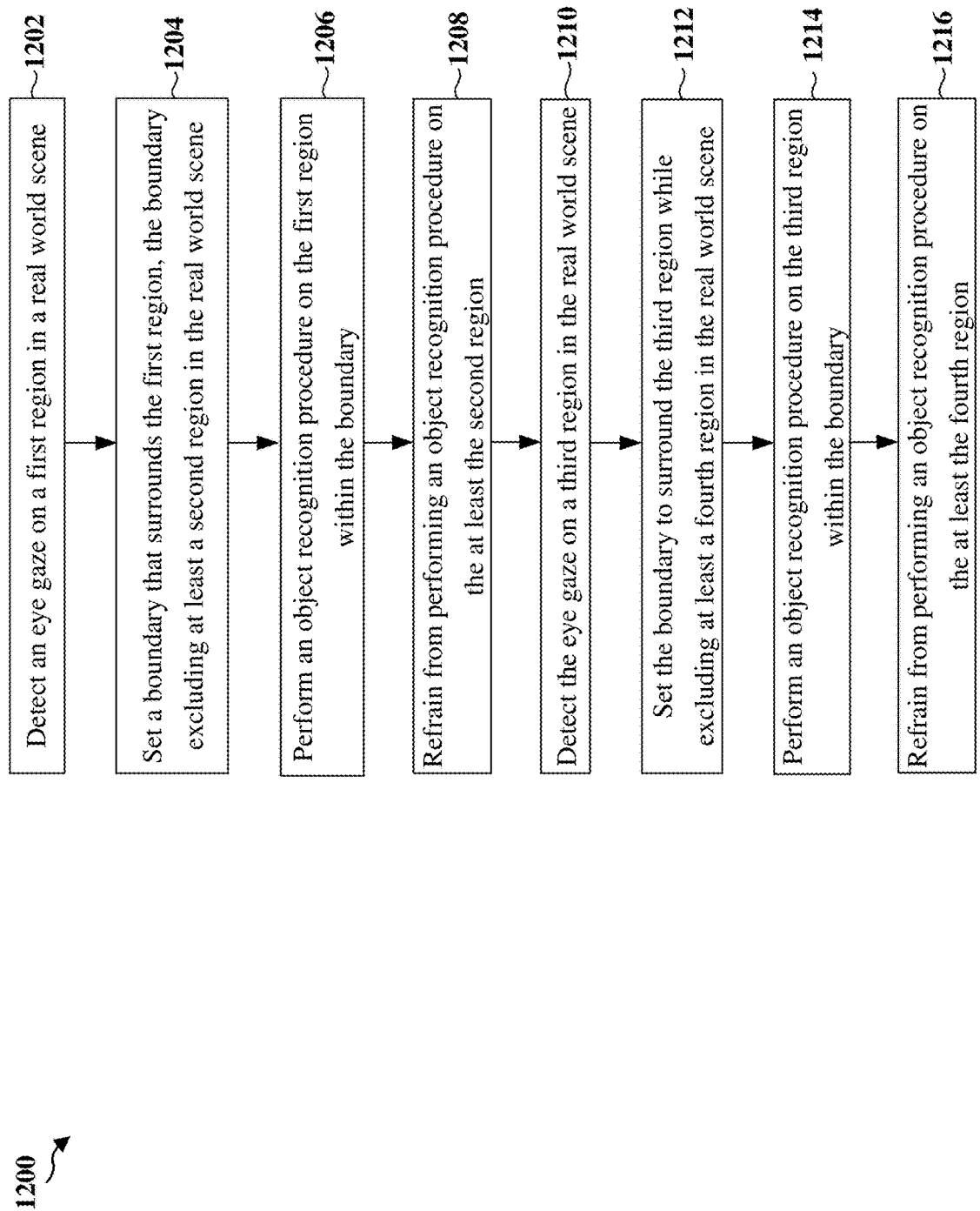
FIG. 12 is a flow chart of a method for an optical device configured to display content.

FIG. 12 is a flow chart 1200 of a method for an optical device configured to display content. At step 1202, the optical device 100 detects an eye gaze on a first region in a real world scene. In an aspect, with reference to FIG. 1, the rear facing camera 112 and/or rear facing camera 118 may detect a user's eye gaze as the user observes a real world scene through the lenses 108 and 110 of the optical device 100. The real world scene may include the physical environment within the field of view of a user of the optical device 100. An example of a real world scene as observed by a user through lenses 108 and 110 is illustrated in FIG. 2. As shown in FIG. 2, the real world scene 200 includes an automobile 202 in the foreground and includes a market 204, a bus sign 206, and a building 208 in the background. In other aspects, the real world scene may be an indoor real world scene, such as the inside of a home, an office, or a library. For example, the user may gaze at the automobile 202 and the optical device 100 may detect the eye gaze of the user on a region of the real world scene 200 where the automobile 202 is located using the rear facing camera 112 and/or rear facing camera 118.

At step 1204, the optical device 100 sets a boundary that surrounds the first region, the boundary excluding at least a second region in the real world scene. For example, with reference to FIG. 4, the optical device 100 may set a boundary 409 that surrounds the region where the automobile 202 is located. In an aspect, the boundary may be displayed in the lens 108 and/or lens 110 of the optical device 100 such that the boundary overlays a portion of the real world scene as the user observes the real world scene using the optical device 100. Although the boundary set by the optical device 100 is described herein as having a rectangular shape, it should be understood that the boundary may have any of a number of different shapes, such as a circular shape.

At step 1206, the optical device 100 performs an object recognition procedure on the first region within the boundary. For example, with reference to FIG. 4, the optical device 100 may perform an object recognition procedure on the region within the boundary 409. In one configuration, the optical device 100 may perform the object recognition procedure by capturing an image of the real world scene 400 using the front facing camera 114 and/or front facing camera 120 and by applying an object recognition algorithm on a region of the image corresponding to the region within the boundary 409. The optical device 100 may compare data generated by the object recognition algorithm to an object database to determine whether the data matches any of the objects in the object database in order to recognize an object. In an aspect, the database may be stored in the optical device 100. For example, with reference to FIG. 4, the optical device 100 may determine that the data generated by the object recognition algorithm matches an object identified as an automobile in the object database.

At step 1208, the optical device 100 refrains from performing an object recognition procedure on the at least the second region. For example, with reference to FIG. 4, the optical device 100 may refrain from performing the object recognition procedure on regions of the real world scene 400 outside the boundary 409.

At step 1210, the optical device 100 detects an eye gaze on a third region in the real world scene. For example, the user may gaze at the automobile 202 as it moves along the street 422 and the optical device 100 may detect the eye gaze of the user on a region of the real world scene 400 where the automobile 202 is located using the rear facing camera 112 and/or rear facing camera 118.

At step 1212, the optical device 100 sets a boundary that surrounds the third region, the boundary excluding at least a fourth region in the real world scene. For example, with reference to FIG. 4, the optical device 100 may set a boundary 410 that surrounds the region where the automobile 202 is located. In an aspect, the boundary may be displayed in the lens 108 and/or lens 110 of the optical device 100 such that the boundary overlays a portion of the real world scene as the user observes the real world scene using the optical device 100.

At step 1214, the optical device 100 performs an object recognition procedure on the third region within the boundary. For example, with reference to FIG. 4, the optical device 100 may perform an object recognition procedure on the region within the boundary 410. In one configuration, the optical device 100 may perform the object recognition procedure by capturing an image of the real world scene 400 using the front facing camera 114 and/or front facing camera 120 and by applying an object recognition algorithm on a region of the image corresponding to the region within the boundary 410. The optical device 100 may compare data generated by the object recognition algorithm to an object database to determine whether the data matches any of the objects in the object database in order to recognize an object. In an aspect, the database may be stored in the optical device 100. For example, with reference to FIG. 4, the optical device 100 may determine that the data generated by the object recognition algorithm matches an object identified as an automobile in the object database.

At step 1216, the optical device 100 refrains from performing an object recognition procedure on the at least the fourth region. For example, with reference to FIG. 4, the optical device 100 may refrain from performing the object recognition procedure on regions of the real world scene 400 outside the boundary 410.

Figure 13:
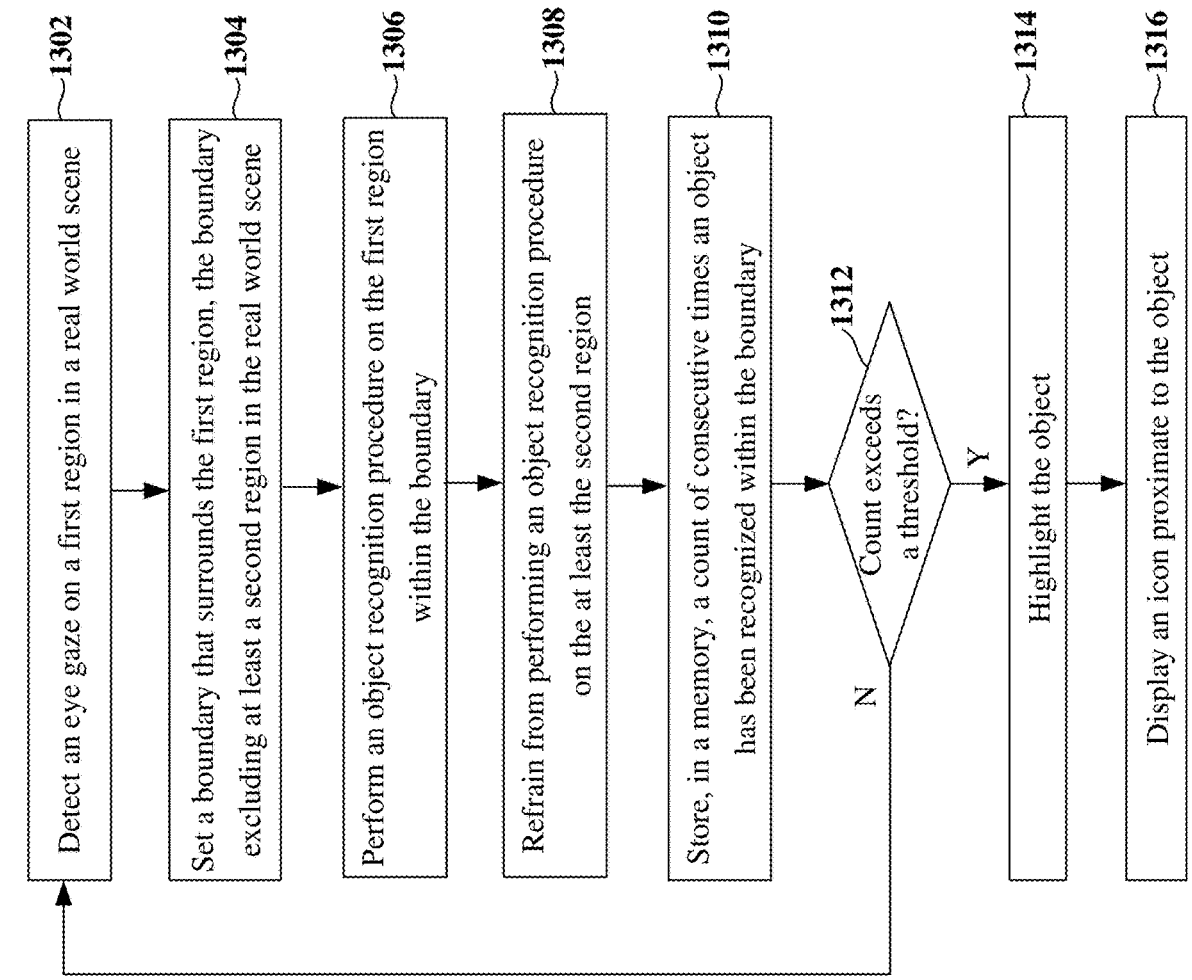
FIG. 13 is a flow chart of a method for an optical device configured to display content.

FIG. 13 is a flow chart 1300 of a method for an optical device configured to display content. At step 1302, the optical device 100 detects an eye gaze on a first region in a real world scene. In an aspect, with reference to FIG. 1, the rear facing camera 112 and/or rear facing camera 118 may detect a user's eye gaze as the user observes a real world scene through the lenses 108 and 110 of the optical device 100. The real world scene may include the physical environment within the field of view of a user of the optical device 100. An example of a real world scene as observed by a user through lenses 108 and 110 is illustrated in FIG. 2. As shown in FIG. 2, the real world scene 200 includes an automobile 202 in the foreground and includes a market 204, a bus sign 206, and a building 208 in the background. In other aspects, the real world scene may be an indoor real world scene, such as the inside of a home, an office, or a library. For example, the user may gaze at the automobile 202 and the optical device 100 may detect the eye gaze of the user on a region of the real world scene 200 where the automobile 202 is located using the rear facing camera 112 and/or rear facing camera 118.

At step 1304, the optical device 100 sets a boundary that surrounds the first region, the boundary excluding at least a second region in the real world scene. For example, with reference to FIG. 3, the optical device 100 may set a boundary 310 that surrounds the region where the automobile 202 is located. In an aspect, the boundary may be displayed in the lens 108 and/or lens 110 of the optical device 100, such that the boundary overlays the user's view of the real world scene as the user observes the real world scene using the optical device 100. Although the boundary set by the optical device 100 is described herein as having a rectangular shape, it should be understood that the boundary may have any of a number of different shapes, such as a circular shape.

At step 1306, the optical device 100 performs an object recognition procedure on the first region within the boundary. For example, with reference to FIG. 3, the optical device 100 may perform an object recognition procedure on the region within the boundary 310. In one configuration, the optical device 100 may perform the object recognition procedure by capturing one or more images of the real world scene 300 using the front facing camera 114 and/or front facing camera 120 to generate one or more image frames. The optical device 100 may then apply an object recognition algorithm on a region of the one or more image frames corresponding to the region within the boundary 310. The optical device 100 may compare data generated by the object recognition algorithm for each image frame to an object database to determine whether the data matches any of the objects in the object database in order to recognize an object. In an aspect, the database may be stored in the optical device 100. For example, with reference to FIG. 3, the optical device 100 may determine that the data generated by the object recognition algorithm matches an object identified as an automobile in the object database.

At step 1308, the optical device 100 refrains from performing an object recognition procedure on the at least the second region. For example, with reference to FIG. 3, the optical device 100 may refrain from performing the object recognition procedure on regions of the real world scene 300 outside the boundary 310.

At step 1310, the optical device 100 stores a count of consecutive times an object has been recognized within the boundary. In one configuration, the count may represent the number of times an object has been recognized within the boundary in each of consecutive image frames. In an aspect, the optical device 100 may further store each successfully recognized object.

At step 1312, the optical device 100 may determine whether the count exceeds a threshold. For example, the threshold may be a predetermined integer. If the count exceeds the threshold, then at step 1314, the optical device 100 may highlight the object. In an aspect, the optical device 100 may highlight the object by displaying a transparent color (e.g., yellow) in a region of the lens 108 and/or lens 110 of the optical device 100 corresponding to the region in which the object is located, such that the object appears to be highlighted when the user observes the object. In another aspect, the optical device 100 may further determine whether the count exceeds a threshold within a predetermined period of time and may drop an earliest image frame if the predetermined period of time has been exceeded.

At step 1316, the optical device 100 may display an icon proximate to the object. In an aspect, the optical device 100 may display the icon in a region of the lens 108 and/or lens 110 of the optical device 100 corresponding to a region proximate to where the object is located. In one configuration, the icon may be configured to initiate a function of the optical device 100. In another configuration, the icon may be configured to provide information related to the object.

If the count does not exceed the threshold (1312), then at step 1302, the optical device 100 detects an eye gaze on a first region in a real world scene.

Figure 14:
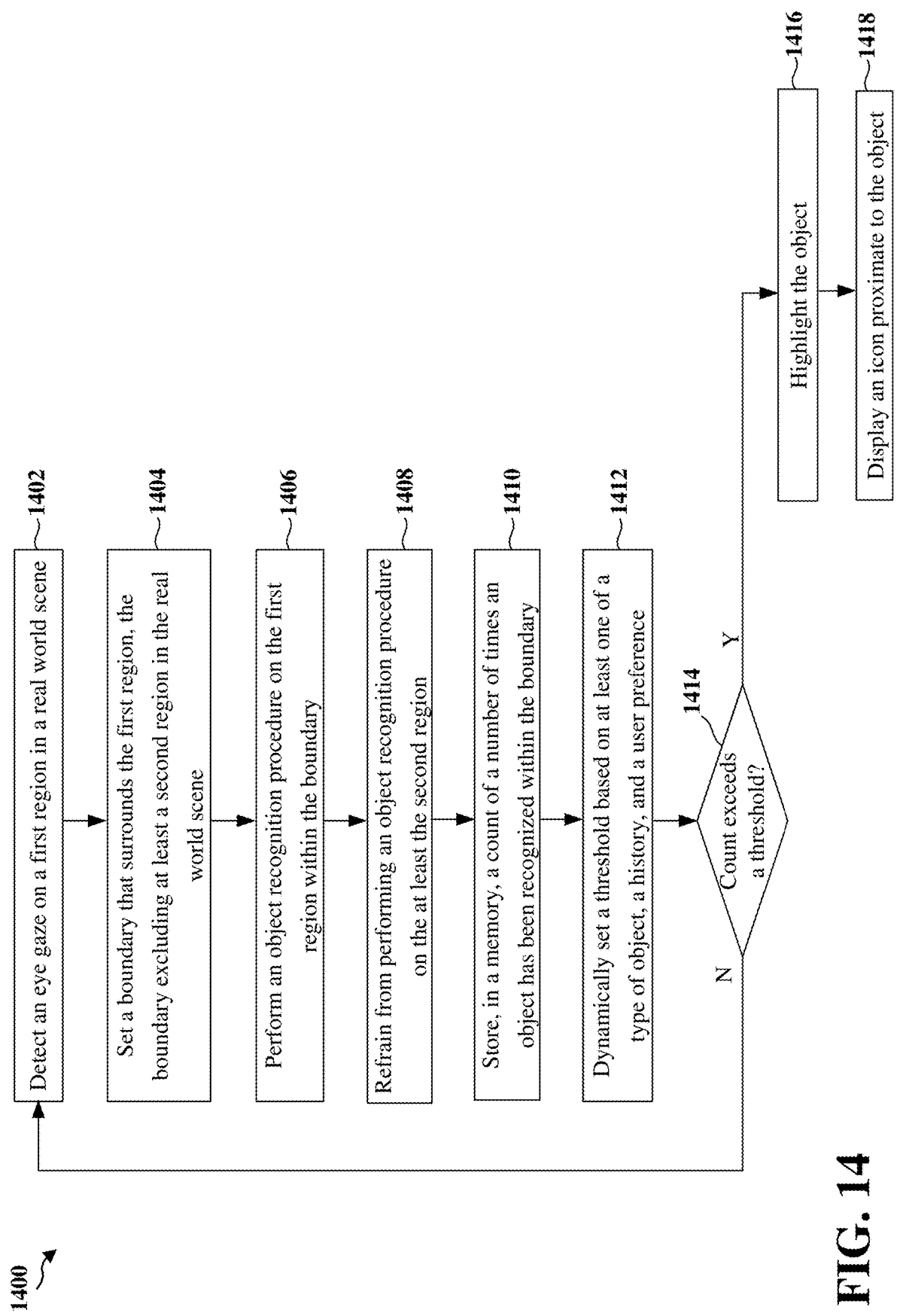
FIG. 14 is a flow chart of a method for an optical device configured to display content.

FIG. 14 is a flow chart 1400 of a method for an optical device configured to display content. At step 1402, the optical device 100 detects an eye gaze on a first region in a real world scene. In one configuration, the optical device 100 may begin the eye gaze detection in response to a voice command and/or a hand gesture. In an aspect, with reference to FIG. 1, the rear facing camera 112 and/or rear facing camera 118 may detect a user's eye gaze as the user observes a real world scene through the lenses 108 and 110 of the optical device 100. The real world scene may include the physical environment within the field of view of a user of the optical device 100. An example of a real world scene as observed by a user through lenses 108 and 110 is illustrated in FIG. 2. As shown in FIG. 2, the real world scene 200 includes an automobile 202 in the foreground and includes a market 204, a bus sign 206, and a building 208 in the background. In other aspects, the real world scene may be an indoor real world scene, such as the inside of a home, an office, or a library. For example, the user may gaze at the automobile 202 and the optical device 100 may detect the eye gaze of the user on a region of the real world scene 200 where the automobile 202 is located using the rear facing camera 112 and/or rear facing camera 118.

At step 1404, the optical device 100 sets a boundary that surrounds the first region, the boundary excluding at least a second region in the real world scene. For example, with reference to FIG. 3, the optical device 100 may set a boundary 310 that surrounds the first region. In an aspect, the boundary may be displayed in the lens 108 and/or 110 of the optical device 100, such that the boundary overlays the user's view of the real world scene as the user observes the real world scene using the optical device 100. Although the boundary set by the optical device 100 is described herein as having a rectangular shape, it should be understood that the boundary may have any of a number of different shapes, such as a circular shape.

At step 1406, the optical device 100 performs an object recognition procedure on the first region within the boundary. For example, with reference to FIG. 3, the optical device 100 may perform an object recognition procedure on the region within the boundary 310. In one configuration, the optical device 100 may perform the object recognition procedure by capturing one or more images of the real world scene 300 using the front facing camera 114 and/or front facing camera 120 to generate one or more image frames. The optical device 100 may then apply an object recognition algorithm on a region of the one or more image frames corresponding to the region within the boundary 310. The optical device 100 may compare data generated by the object recognition algorithm for each image frame to an object database to determine whether the data matches any of the objects in the object database in order to recognize an object. In an aspect, the database may be stored in the optical device 100. For example, with reference to FIG. 3, the optical device 100 may determine that the data generated by the object recognition algorithm matches an object identified as an automobile in the object database.

At step 1408, the optical device 100 refrains from performing an object recognition procedure on the at least the second region. For example, with reference to FIG. 3, the optical device 100 may refrain from performing the object recognition procedure on regions of the real world scene 300 outside the boundary 310.

At step 1410, the optical device 100 stores a count of a number of times an object has been recognized within the boundary. In one configuration, the count may represent the number of times an object has been recognized within the boundary in one or more of the image frames. In an aspect, the optical device 100 may further store each successfully recognized object.

At step 1412, the optical device 100 may dynamically set a threshold based on at least one of a type of object, a history, and a user preference. In an aspect, the threshold may be an integer. For example, if the type of object is stationary and simple to identify, such as a building, a lower threshold value may be used. As another example, if the type of object is mobile and more difficult to identify, such as an automobile, a higher threshold value may be used.

At step 1414, the optical device 100 may determine whether the count exceeds a threshold. If the count exceeds the threshold, then at step 1416, the optical device 100 may highlight the object. In an aspect, the optical device 100 may highlight the object by displaying a transparent color (e.g., yellow) in a region of the lens 108 and/or lens 110 of the optical device 100 corresponding to a region in which the object is located, such that the object appears to be highlighted when the user observes the object. In another aspect, the optical device 100 may further determine whether the count exceeds a threshold within a predetermined period of time and may drop an earliest image frame if the predetermined period of time has been exceeded.

At step 1418, the optical device 100 may display an icon proximate to the object. In an aspect, the optical device 100 may display the icon in a region of the lens 108 and/or lens 110 of the optical device 100 corresponding to a region proximate to where the object is located. In one configuration, the icon may be configured to initiate a function of the optical device 100. In another configuration, the icon may be configured to provide information related to the object.

If the count does not exceed the threshold (1414), then at step 1402, the optical device 100 detects an eye gaze on a first region in a real world scene.

Figure 15:
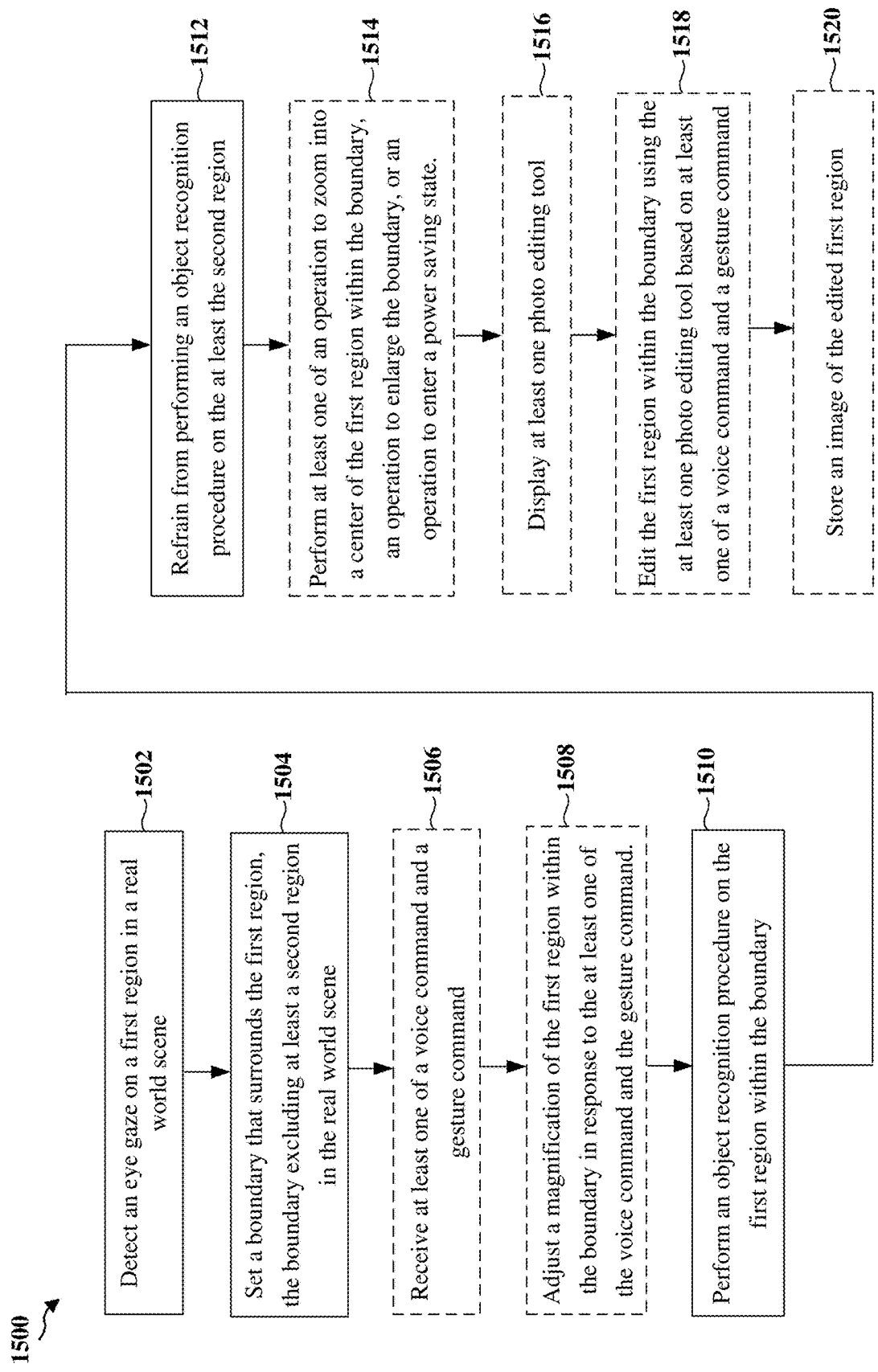
FIG. 15 is a flow chart of a method for an optical device configured to display content.

FIG. 15 is a flow chart 1500 of a method for an optical device configured to display content. At step 1502, the optical device 100 detects an eye gaze on a first region in a real world scene. In one configuration, the optical device 100 may begin the eye gaze detection in response to a voice command and/or a hand gesture. In an aspect, with reference to FIG. 1, the rear facing camera 112 and/or rear facing camera 118 may detect a user's eye gaze as the user observes a real world scene through the lenses 108 and 110 of the optical device 100. The real world scene may include the physical environment within the field of view of a user of the optical device 100. An example of a real world scene as observed by a user through lenses 108 and 110 is illustrated in FIG. 2. As shown in FIG. 2, the real world scene 200 includes an automobile 202 in the foreground and includes a market 204, a bus sign 206, and a building 208 in the background. In other aspects, the real world scene may be an indoor real world scene, such as the inside of a home, an office, or a library. For example, the user may gaze at the automobile 202 and the optical device 100 may detect the eye gaze of the user on a region of the real world scene 200 where the automobile 202 is located using the rear facing camera 112 and/or rear facing camera 118.

At step 1504, the optical device 100 sets a boundary that surrounds the first region, the boundary excluding at least a second region in the real world scene. For example, with reference to FIG. 3, the optical device 100 may set a boundary 310 that surrounds the region of the real world scene 200 where the automobile 202 is located. In an aspect, the boundary may be displayed in the lens 108 and/or lens 110 of the optical device 100 such that the boundary overlays a portion of the real world scene as the user observes the real world scene using the optical device 100. Although the boundary set by the optical device 100 is described herein as having a rectangular shape, it should be understood that the boundary may have any of a number of different shapes, such as a circular shape.

At step 1506, the optical device 100 receives at least one of a voice command and a gesture command. In an aspect, the voice command and the gesture command may be received via sensor 116 and/or sensor 122 of the optical device 100.

At step 1508, the optical device 100 may adjust a magnification of the first region within the boundary in response to the at least one of the voice command and the gesture command. For example, with reference to the real world scene 700 in FIG. 7, the optical device 100 may adjust the magnification of a portion of the real world scene 700 within the boundary 710 as shown in the real world scene 800 of FIG. 8. In an aspect, the optical device 100 may perform the magnification in response to the voice command and/or the hand gesture. In one configuration, the hand gesture may be "pinch zoom" gesture, such that the magnification of a portion of the real world scene 700 within the boundary 710 is increased as the user performs a pinch gesture.

At step 1510, the optical device 100 performs an object recognition procedure on the first region within the boundary. For example, with reference to FIG. 3, the optical device 100 may perform an object recognition procedure on the region within the boundary 310. In one configuration, the optical device 100 may perform the object recognition procedure by capturing an image of the real world scene 300 using the front facing camera 114 and/or front facing camera 120 and by applying an object recognition algorithm on a region of the image corresponding to the region within the boundary 310. The optical device 100 may compare data generated by the object recognition algorithm to an object database to determine whether the data matches any of the objects in the object database in order to recognize an object. In an aspect, the database may be stored in the optical device 100. For example, with reference to FIG. 3, the optical device 100 may determine that the data generated by the object recognition algorithm matches an object identified as an automobile in the object database.

At step 1512, the optical device 100 refrains from performing an object recognition procedure on the at least second region. For example, with reference to FIG. 3, the optical device 100 may refrain from performing the object recognition procedure on regions of the real world scene 300 outside the boundary 310.

At step 1514, the optical device 100 performs at least one of an operation to zoom into a center of the first region within the boundary, an operation to enlarge the boundary, or an operation to enter a power saving state. In an aspect, the optical device 100 may zoom into a center of the first region within the boundary when the duration of the eye gaze of the user exceeds a time threshold. In another aspect, the optical device 100 may zoom into a center of the first region within the boundary when the object within the boundary is recognized before exceeding a time threshold in order to provide a better view of the object. In one configuration, the optical device 100 may also zoom into one or more application icons proximate to the object.

For example, with reference to FIG. 5, the optical device 100 may dynamically adjust the size of the boundary 510 if the object recognition procedure fails to determine an object. For example, if the object recognition procedure is not able to identify the automobile 202 within the boundary 510, the optical device 100 may increase the size of the boundary 510 to the size of boundary 520. In one configuration, the size of the boundary may be increased by a predetermined amount. For example, the optical device 100 may increase the size of the boundary by doubling the size of the original boundary.

At step 1516, the optical device 100 displays at least one photo editing tool. In an aspect, with reference to FIG. 9, the optical device 100 may display a photo editing interface 912 that includes one or more photo editing tools. For example, the photo editing tools may include an art filter application tool 914 and/or other photo editing tools, such as a clip art insertion tool, a color saturation tool, a sepia tone conversion tool, and a black and white conversion tool. In an aspect, the photo editing tools may be applied or disabled in response to a voice command and/or a hand gesture received via sensor 116 and/or sensor 122.

At step 1518, the optical device 100 may edit the first region within the boundary using the at least one photo editing tool based on at least one of a voice command and a gesture command. For example, with reference to FIG. 9, the at least one photo editing tool may be used to edit the region within the boundary 910 prior to capturing a photo of the real world scene 900 with the front facing camera 114 and/or front facing camera 120.

At step 1520, the optical device 100 may store an image of the edited first region. For example, with reference to FIG. 9, the optical device 100 may capture and store a photo of the real world scene 900 as edited using the previously discussed photo editing tools.

Figure 16:
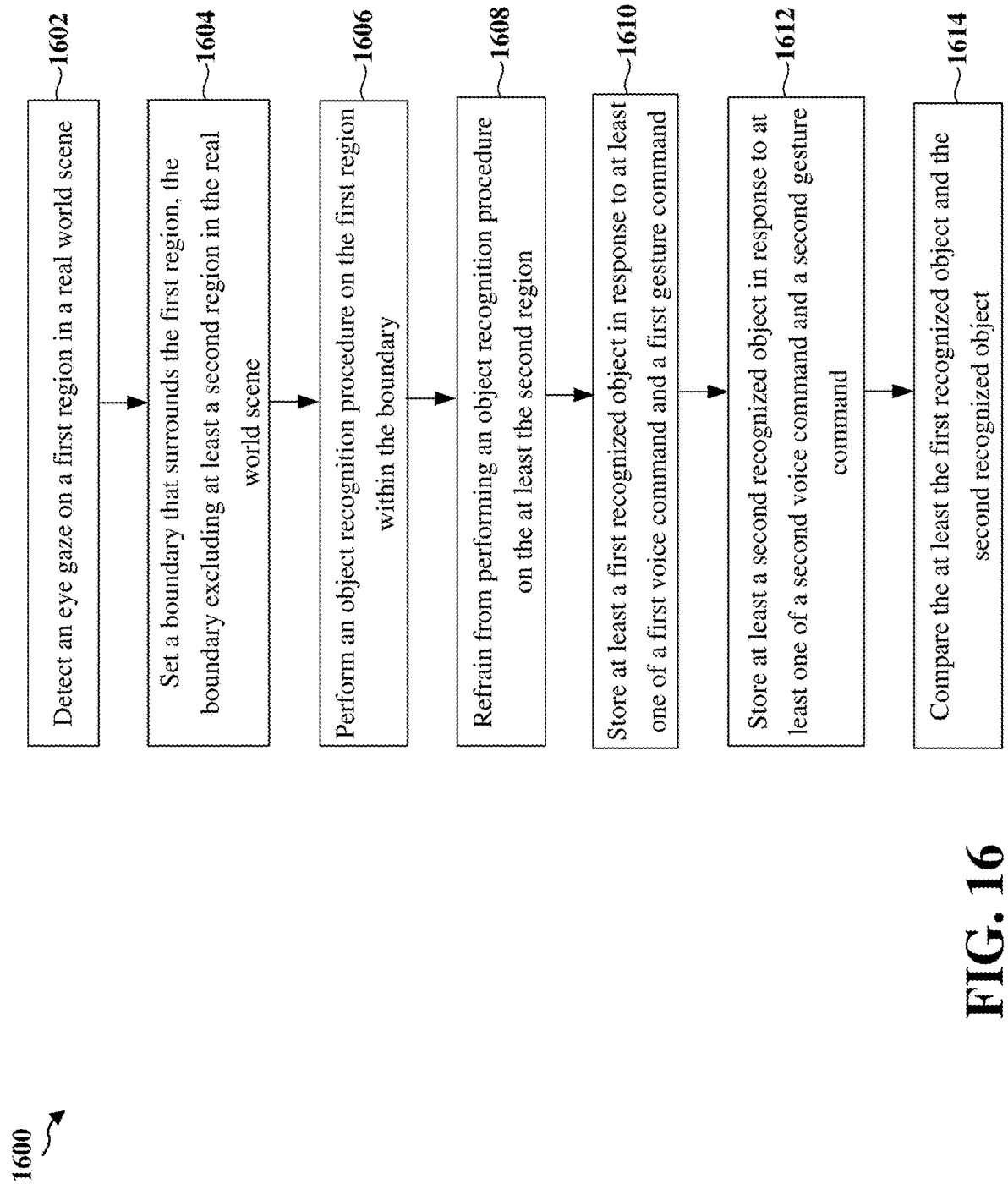
FIG. 16 is a flow chart of a method for an optical device configured to display content.

FIG. 16 is a flow chart 1600 of a method for an optical device configured to display content. At step 1602, the optical device 100 detects an eye gaze on a first region in a real world scene. In an aspect, with reference to FIG. 10, the rear facing camera 112 and/or rear facing camera 118 may detect a user's eye gaze as the user observes a real world scene through the lenses 108 and 110 of the optical device 100. The real world scene may include the physical environment within the field of view of a user of the optical device 100. An example of a real world scene as observed by a user through lenses 108 and 110 is illustrated in FIG. 10. As shown in FIG. 10, the real world scene 1000 includes an automobile 202 in the foreground and includes a market 204, a bus sign 206, and a building 208 in the background. In other aspects, the real world scene may be an indoor real world scene, such as the inside of a home, an office, or a library. For example, the user may gaze at the automobile 202 and the optical device 100 may detect the eye gaze of the user on a region of the real world scene 1000 where the automobile 202 is located using the rear facing camera 112 and/or rear facing camera 118.

At step 1604, the optical device 100 sets a boundary that surrounds the first region, the boundary excluding at least a second region in the real world scene. For example, with reference to FIG. 10, the optical device 100 may set a boundary 1010 that surrounds the region where the automobile 202 is located. In an aspect, the boundary may be displayed in the lens 108 and/or lens 110 of the optical device 100 such that the boundary overlays a portion of the real world scene as the user observes the real world scene using the optical device 100. Although the boundary set by the optical device 100 is described herein as having a rectangular shape, it should be understood that the boundary may have any of a number of different shapes, such as a circular shape.

At step 1606, the optical device 100 performs an object recognition procedure on the first region within the boundary. For example, with reference to FIG. 10, the optical device 100 may perform an object recognition procedure on the region within the boundary 1010. In one configuration, the optical device 100 may perform the object recognition procedure by capturing an image of the real world scene 1000 using the front facing camera 114 and/or front facing camera 120 and by applying an object recognition algorithm on a region of the image corresponding to the region within the boundary 1010. The optical device 100 may compare data generated by the object recognition algorithm to an object database to determine whether the data matches any of the objects in the object database in order to recognize an object. In an aspect, the database may be stored in the optical device 100. For example, with reference to FIG. 10, the optical device 100 may determine that the data generated by the object recognition algorithm matches an object identified as an automobile in the object database.

At step 1608, the optical device 100 refrains from performing an object recognition procedure on the at least the second region. For example, with reference to FIG. 10, the optical device 100 may refrain from performing the object recognition procedure on regions of the real world scene 1000 outside the boundary 1010.

At step 1610, the mobile device stores at least a first recognized object in response to at least one of a first voice command and a first gesture command. For example, with reference to FIG. 10, the optical device 100 may store the automobile 202 in a memory of the optical device 100 in response to at least one of a first voice command and a first gesture command.

At step 1612, the optical device 100 stores at least a second recognized object in response to at least one of a second voice command and a second gesture command. For example, with reference to FIG. 10, the optical device 100 may recognize the automobile 1002 within the boundary 1012 and may store the automobile 1002 in a memory of the optical device 100 in response to at least one of a second voice command and a second gesture command.

At step 1614, the optical device 100 compares the at least the first recognized object and the second recognized object. In an aspect, the optical device 100 may indicate whether the automobile 202 is the same as or different from the automobile 1002.

Figure 17:
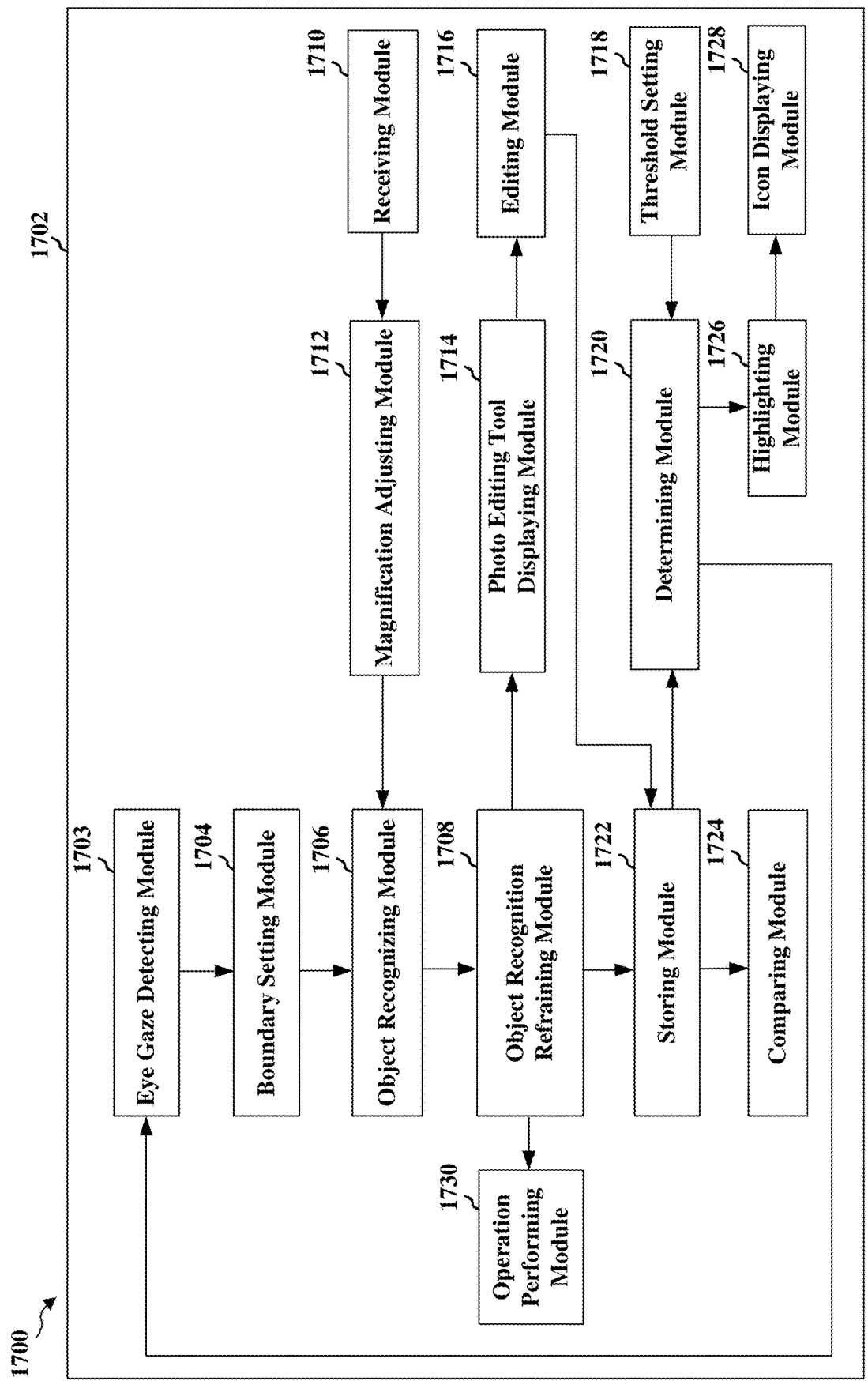
FIG. 17 is a conceptual flow diagram illustrating the operation of different modules/means/components in an exemplary apparatus.

FIG. 17 is a conceptual flow diagram 1700 illustrating the operation of different modules/means/components in an exemplary apparatus 1702. The apparatus 1702 may be an optical device, such as the optical device 100 shown in FIG. 1. The apparatus 1702 includes an eye gaze detecting module 1703, a boundary setting module 1704, an object recognizing module 1706, an object recognition refraining module 1708, a receiving module 1710, a magnification adjusting module 1712, a photo editing tool displaying module 1714, an editing module 1716, a threshold setting module 1718, a determining module 1720, a storing module 1722, a comparing module 1724, a highlighting module 1726, an icon displaying module 1728, and an operation performing module 1730.

In an aspect, the eye gaze detecting module 1703 detects the eye gaze of a user on a region of a real world scene. The boundary setting module 1704 sets a boundary that surrounds the region of the real world scene. The object recognizing module 1706 performs an object recognition procedure on the region within the boundary. In one configuration, the object recognition procedure is performed on the first region within the boundary for one or more of a plurality of image frames of the real world scene. The object recognition refraining module 1708 refrains from performing the object recognition procedure on regions outside the boundary. The eye gaze detecting module 1703 may detect the eye gaze on a third region in the real world scene and the boundary setting module 1704 may set the boundary to surround the third region while excluding at least a fourth region in the real world scene.

In an aspect, the storing module 1722 stores a first count of consecutive times an object has been recognized within the boundary or a second count of a number of times an object has been recognized within the boundary. The determining module 1720 determines whether the first count or the second count exceeds a threshold. The highlighting module 1726 highlights the object when the first count or the second count exceeds the threshold. The icon displaying module 1728 displays an icon proximate to the object when the first count or the second count exceeds the threshold.

In another aspect, the storing module 1722 stores at least a first recognized object in response to at least one of a first voice command and a first gesture command and stores at least a second recognized object in response to at least one of a second voice command and a second gesture command. The comparing module 1724 then compares the at least the first recognized object and the second recognized object to determine whether the first recognized object is the same as or different from the second recognized object.

In an aspect, the object recognition procedure is performed on the first region within the boundary for one or more of a plurality of image frames of the real world scene and the storing module 1722 stores a count of a number of times an object has been recognized within the boundary. The threshold setting module 1718 dynamically sets a threshold based on at least one of a type of object, a history, and a user preference. The determining module 1720 determines whether the count exceeds the threshold. The highlighting module 1726 highlights the object when the count exceeds the threshold. The icon displaying module 1728 displays an icon proximate to the object when the count exceeds the threshold.

The operation performing module 1730 performs at least one of an operation to zoom into a center of the first region within the boundary, an operation to enlarge the boundary, or an operation to enter a power saving state if no object has been recognized in the first region within the boundary.

The receiving module 1710 receives at least one of a voice command and a gesture command. The magnification adjustment module 1712 adjusts a magnification of the first region within the boundary in response to the at least one of the voice command and the gesture command.

The photo editing tool displaying module 1714 displays at least one photo editing tool. The editing module 1716 edits the first region within the boundary using the at least one photo editing tool based on at least one of a voice command and a gesture command. The storing module 1722 stores an image of the edited first region.

The apparatus may include additional modules that perform each of the steps of the algorithm in the aforementioned flow charts of FIGS. 11-16. As such, each step in the aforementioned flow charts of FIGS. 11-16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
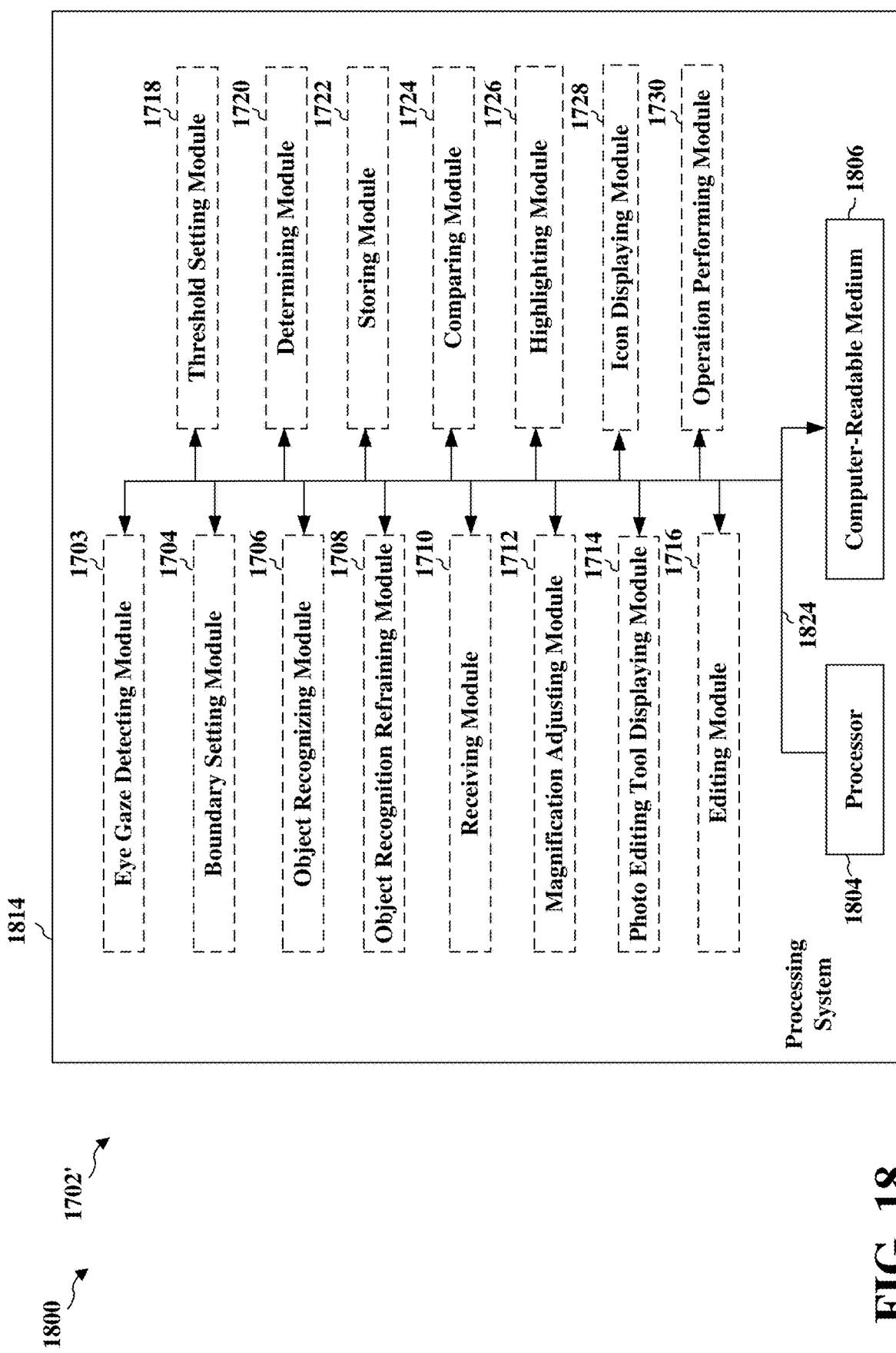
FIG. 18 is a diagram illustrating an example of a hardware implementation for an apparatus employing a processing system.

FIG. 18 is a diagram illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1703, 1704, 1706, 1708, 1710, 1712, 1714, 1716, 1718, 1720, 1722, 1724, 1726, 1728, and 1730, and the computer-readable medium 1806. The bus 1824 may also link various other circuits such as timing sources, peripherals, voltage regulators, and power management circuits, which are well known in the art, and therefore, will not be described any further.

The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1703, 1704, 1706, 1708, 1710, 1712, 1714, 1716, 1718, 1720, 1722, 1724, 1726, 1728, and 1730. The modules may be software modules running in the processor 1804, resident/stored in the computer readable medium 1806, one or more hardware modules coupled to the processor 1804, or some combination thereof.

In one configuration, the apparatus 1702/1702' includes means for detecting an eye gaze on a first region in a real world scene, means for setting a boundary that surrounds the first region, the boundary excluding at least a second region in the real world scene, means for performing an object recognition procedure on the first region within the boundary, means for refraining from performing an object recognition procedure on the at least the second region, means for detecting the eye gaze on a third region in the real world scene, means for setting the boundary to surround the third region while excluding at least a fourth region in the real world scene, means for storing a first count of consecutive times an object has been recognized within the boundary or a second count of a number of times an object has been recognized within the boundary, means for determining whether the first count or the second count exceeds a threshold, means for highlighting the object when the first count or the second count exceeds the threshold, means for displaying an icon proximate to the object when the first count or the second count exceeds the threshold, means for performing at least one operation, the at least one operation including at least one of an operation to zoom into a center of the first region within the boundary, an operation to enlarge the boundary, or an operation to enter a power saving state if no object has been recognized in the first region within the boundary, means for storing a count of a number of times an object has been recognized within the boundary, means for dynamically setting a threshold based on at least one of a type of object, a history, and a user preference, means for determining whether the count exceeds the threshold, means for highlighting the object when the count exceeds the threshold, means for displaying an icon proximate to the object when the count exceeds the threshold, means for receiving at least one of a voice command and a gesture command, means for adjusting a magnification of the first region within the boundary in response to the at least one of the voice command and the gesture command, means for displaying at least one photo editing tool, means for editing the first region within the boundary using the at least one photo editing tool based on at least one of a voice command and a gesture command, means for storing an image of the edited first region, means for storing at least a first recognized object in response to at least one of a first voice command and a first gesture command, means for storing at least a second recognized object in response to at least one of a second voice command and a second gesture command, and means for comparing the at least the first recognized object and the second recognized object.

The aforementioned means may be one or more of the aforementioned modules of the apparatus 1702 and/or the processing system 1814 of the apparatus 1702' configured to perform the functions recited by the aforementioned means.

Therefore, by reducing the size of the boundary and performing the object recognition procedure on a region within the reduced boundary, the optical device may reduce the amount of processing needed to recognize an object and, therefore, may conserve battery power. Moreover, the aspects disclosed herein improve interaction with augmented reality by coordinating hand gestures, eye/head tracking, and voice commands.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of controlling a device configured to display content, the method comprising:
   detecting an eye gaze of a user on a first region in a real world scene;
   in response to detecting the eye gaze of the user on the first region in the real world scene, displaying a photo editing tool interface including two or more different photo editing tools, wherein the photo editing tool interface including the two or more different photo editing tools is displayed while the user gazes at the real world scene, via the device, prior to capturing a photo of at least a portion of the real world scene;
   receiving a selection of at least one of the photo editing tools;
   editing the first region using the at least one selected photo editing tool; and
   subsequent to receiving the selection of the at least one of the photo editing tools, capturing a photo of at least a portion of the real world scene including the edited first region.

2. The method of claim 1, further comprising:
   performing a procedure on one or more of a plurality of image frames of the real world scene to identify an object within the first region; and
   highlighting the object or displaying an icon proximate to the object while the eye gaze remains on the object.

3. The method of claim 2, wherein the procedure is an object recognition procedure.

4. The method of claim 2, further comprising:
   setting a boundary that surrounds the first region, the boundary excluding at least a second region in the real world scene; and
   refraining from performing the procedure on the at least the second region.

5. The method of claim 4, further comprising:
   detecting the eye gaze on a third region in the real world scene; and
   setting the boundary to surround the third region while excluding at least a fourth region in the real world scene.

6. The method of claim 2, further comprising:
   determining a first count of consecutive times the object has been identified by the procedure or a second count of a number of times the object has been identified;
   highlighting the object when the first count or the second count exceeds a threshold; and
   displaying an icon proximate to the object when the first count or the second count exceeds the threshold.

7. The method of claim 4, wherein if no object has been identified in the first region within the boundary, the method further comprises performing at least one of an operation to zoom into a center of the first region within the boundary, an operation to enlarge the boundary, or an operation to enter a power saving state.

8. The method of claim 4, further comprising:
   receiving at least one of a voice command and a gesture command; and
   adjusting a magnification of the first region within the boundary in response to the at least one of the voice command and the gesture command.

9. The method of claim 1, wherein editing the first region is based on at least one of a voice command and a gesture command.

10. The method of claim 1, further comprising:
    storing the photo of the edited first region;
    wherein editing the first region using the at least one selected photo editing tool includes editing the first region prior to capturing the photo.

11. An apparatus for controlling a device configured to display content, the apparatus comprising:
    means for detecting an eye gaze of a user on a first region in a real world scene;
    means for displaying, in response to detecting the eye gaze of the user on the first region in the real world scene, a photo editing tool interface including two or more different photo editing tools, wherein the photo editing tool interface including the two or more different photo editing tools is displayed while the user gazes at the real world scene, via the device, prior to capturing a photo of at least a portion of the real world scene;
means for receiving a selection of at least one of the photo editing tools;
means for editing the first region using the at least one selected photo editing tool; and
means for capturing, subsequent to receiving the selection of the at least one of the photo editing tools, a photo of at least a portion of the real world scene including the edited first region.

12. The apparatus of claim 11, further comprising:
means for performing a procedure on one or more of a plurality of image frames of the real world scene to identify an object within the first region; and
means for highlighting the object or displaying an icon proximate to the object while the eye gaze remains on the object.

13. The apparatus of claim 12, wherein the procedure is an object recognition procedure.

14. The apparatus of claim 12, further comprising:
means for setting a boundary that surrounds the first region, the boundary excluding at least a second region in the real world scene; and
means for refraining from performing the procedure on the at least the second region.

15. The apparatus of claim 14, further comprising:
means for detecting the eye gaze on a third region in the real world scene; and
means for setting the boundary to surround the third region while excluding at least a fourth region in the real world scene.

16. The apparatus of claim 12, further comprising:
means for determining a first count of consecutive times the object has been identified by the procedure or a second count of a number of times the object has been identified;
means for highlighting the object when the first count or the second count exceeds a threshold; and
means for displaying an icon proximate to the object when the first count or the second count exceeds the threshold.

17. The apparatus of claim 14, further comprising means for performing at least one operation, the at least one operation comprising at least one of an operation to zoom into a center of the first region within the boundary, an operation to enlarge the boundary, or an operation to enter a power saving state if no object has been identified in the first region within the boundary.

18. The apparatus of claim 14, further comprising:
means for receiving at least one of a voice command and a gesture command; and
means for adjusting a magnification of the first region within the boundary in response to the at least one of the voice command and the gesture command.

19. The apparatus of claim 11, wherein the means for editing the first region is based on at least one of a voice command and a gesture command.

20. The apparatus of claim 11, further comprising:
means for storing the photo of the edited first region;
wherein editing the first region using the at least one selected photo editing tool includes editing the first region prior to capturing the photo.

21. An apparatus for controlling a device configured to display content, the apparatus comprising:
a memory;
at least one processor coupled to the memory and configured to:
detect an eye gaze of a user on a first region in a real world scene;
in response to detecting the eye gaze of the user on the first region in the real world scene, display a photo editing tool interface including two or more different photo editing tools, wherein the photo editing tool interface including the two or more different photo editing tools is displayed while the user gazes at the real world scene, via the device, prior to capturing a photo of at least a portion of the real world scene;
receive a selection of at least one of the photo editing tools;
edit the first region using the at least one selected photo editing tool; and
subsequent to receiving the selection of the at least one of the photo editing tools, capture a photo of at least a portion of the real world scene including the edited first region.

22. The apparatus of claim 21, wherein the at least one processor is further configured to:
perform a procedure on one or more of a plurality of image frames of the real world scene to identify an object within the first region; and
highlight the object or display an icon proximate to the object while the eye gaze remains on the object.

23. The apparatus of claim 22, wherein the procedure is an object recognition procedure.

24. The apparatus of claim 22, wherein the at least one processor is further configured to:
set a boundary that surrounds the first region, the boundary excluding at least a second region in the real world scene; and
refrain from performing the procedure on the at least the second region.

25. The apparatus of claim 24, wherein the at least one processor is further configured to:
detect the eye gaze on a third region in the real world scene; and
set the boundary to surround the third region while excluding at least a fourth region in the real world scene.

26. The apparatus of claim 22, wherein the at least one processor is further configured to:
determine a first count of consecutive times the object has been identified by the procedure or a second count of a number of times the object has been identified;
highlight the object when the first count or the second count exceeds a threshold; and
display an icon proximate to the object when the first count or the second count exceeds the threshold.

27. The apparatus of claim 24, wherein the at least one processor is further configured to:
perform at least one of an operation to zoom into a center of the first region within the boundary, an operation to enlarge the boundary, or an operation to enter a power saving state if no object has been identified in the first region within the boundary.

28. The apparatus of claim 24, wherein the at least one processor is further configured to:
receive at least one of a voice command and a gesture command; and
adjust a magnification of the first region within the boundary in response to the at least one of the voice command and the gesture command.

29. The apparatus of claim 21, wherein editing the first region is based on at least one of a voice command and a gesture command.

30. The apparatus of claim 21, wherein the at least one processor is further configured to:
  store the photo of the edited first region;
  wherein editing the first region using the at least one selected photo editing tool includes editing the first region prior to capturing the photo.

31. A non-transitory computer-readable medium comprising code for:
  detecting an eye gaze of a user on a first region in a real world scene;
  in response to detecting the eye gaze of the user on the first region in the real world scene, displaying a photo editing tool interface including two or more different photo editing tools, wherein the photo editing tool interface including the two or more different photo editing tools is displayed while the user gazes at the real world scene, via the device, prior to capturing a photo of at least a portion of the real world scene;
  receiving a selection of at least one of the photo editing tools;
  editing the first region using the at least one selected photo editing tool; and
  subsequent to receiving the selection of the at least one of the photo editing tools, capturing a photo of at least a portion of the real world scene including the edited first region.

32. The non-transitory computer-readable medium of claim 31, the computer-readable medium further comprising code for:
  performing a procedure on one or more of a plurality of image frames of the real world scene to identify an object within the first region; and
  highlighting the object or display an icon proximate to the object while the eye gaze remains on the object.

33. The non-transitory computer-readable medium of claim 32, wherein the procedure is an object recognition procedure.

34. The non-transitory computer-readable medium of claim 32, the computer-readable medium further comprising code for:
  setting a boundary that surrounds the first region, the boundary excluding at least a second region in the real world scene; and
  refraining from performing the procedure on the at least the second region.

35. The non-transitory computer-readable medium of claim 34, the computer-readable medium further comprising code for:
  detecting the eye gaze on a third region in the real world scene; and
  setting the boundary to surround the third region while excluding at least a fourth region in the real world scene.

36. The non-transitory computer-readable medium of claim 32, the computer-readable medium further comprising code for:
  determining a first count of consecutive times the object has been identified by the procedure or a second count of a number of times the object has been identified;
  highlighting the object when the first count or the second count exceeds a threshold; and
  displaying an icon proximate to the object when the first count or the second count exceeds the threshold.

37. The non-transitory computer-readable medium of claim 34, the computer-readable medium further comprising code for performing at least one of an operation to zoom into a center of the first region within the boundary, an operation to enlarge the boundary, or an operation to enter a power saving state if no object has been identified in the first region within the boundary.

38. The non-transitory computer-readable medium of claim 34, the computer-readable medium further comprising code for:
  receiving at least one of a voice command and a gesture command; and
  adjusting a magnification of the first region within the boundary in response to the at least one of the voice command and the gesture command.

39. The non-transitory computer-readable medium of claim 31, wherein editing the first region is based on at least one of a voice command and a gesture command.

40. The non-transitory computer-readable medium of claim 31, the computer-readable medium further comprising code for:
  storing the photo of the edited first region;
  wherein editing the first region using the at least one selected photo editing tool includes editing the first region prior to capturing the photo.

* * * * *